US011967212B2

(12) United States Patent
Kendall et al.

(10) Patent No.: US 11,967,212 B2

(45) **Date of Patent: *Apr. 23, 2024**

(54) ELECTRONIC GAMING MACHINE WITH BASE GAMES AND UPGRADED FREE FEATURE GAMES WITH MULTIPLE VERSIONS DISPLAYED

(71) Applicant: Aristocrat Technologies Australia Pty Limited, North Ryde (AU)

(72) Inventors: Karen Kendall, Toongabbie (AU); Amy Batsiokis, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,938

(22) Filed: Nov. 1, 2022

(65) Prior Publication Data

US 2023/0274620 A1 Aug. 31, 2023

Related U.S. Application Data

(63) Continuation of application No. 17/079,400, filed on Oct. 23, 2020, now Pat. No. 11,488,452, which is a (Continued)

(51) Int. Cl.

*G07F 17/34* (2006.01)

*G07F 17/32* (2006.01)

(52) U.S. Cl.

CPC .......... *G07F 17/34* (2013.01); *G07F 17/3213* (2013.01); *G07F 17/3244* (2013.01)

(58) Field of Classification Search

CPC .................................................. G07F 17/3267

See application file for complete search history.

(56) References Cited

U.S. PATENT DOCUMENTS

D213,676 S 4/1969 Biro

D398,597 S 9/1998 Morioka (Continued)

FOREIGN PATENT DOCUMENTS

EM 0031804620004 6/2016

EM 0041240300002 7/2017

EM 0085382430003 5/2021

OTHER PUBLICATIONS

"Huge Win! Queen of the Nile Deluxe Slot—Max Bet Bonus!," screenshots of YouTube video, download date Apr. 30, 2019, published on Sep. 5, 2018, 7 pages.

(Continued)

*Primary Examiner* — Jay Trent Liddle

(74) *Attorney, Agent, or Firm* — McAndrews, Held & Malloy, Ltd.

(57) ABSTRACT

In a gaming machine for playing a base game having a feature game with multiple levels: receiving a wager from a player for playing four instances of the base game, where the wager is deducted from a credit balance established by the player. Symbols for each of the four instances of the base game may be selected and displayed, where each instance displays the selected plurality of symbols in a matrix of display positions. The feature game may be initiated when the selected plurality of symbols includes a feature game trigger, where the feature game comprises a plurality of free plays of a number of instances of the base game based on a level of the feature game as determined by the feature game trigger, and the number of instances is one if the level is normal, four if the level is super, and eight if the level is extreme.

20 Claims, 28 Drawing Sheets

Related U.S. Application Data continuation of application No. 15/995,021, filed on May 31, 2018, now Pat. No. 10,818,145.

(60) Provisional application No. 62/554,402, filed on Sep. 5, 2017.

(56) References Cited

U.S. PATENT DOCUMENTS

| | | | |
|---|---|---|---|
| 6,186,894 | B1 | 2/2001 | Mayeroff |
| D498,267 | S | 11/2004 | Crouch |
| 7,029,396 | B2 | 4/2006 | Jaffe |
| D560,724 | S | 1/2008 | Johnson |
| D560,725 | S | 1/2008 | Johnson |
| D623,657 | S | 9/2010 | Fitzmaurice |
| D626,560 | S | 11/2010 | Fitzmaurice |
| D627,366 | S | 11/2010 | Martiros |
| D629,420 | S | 12/2010 | O'Donnell |
| 7,988,549 | B2 | 8/2011 | Little |
| D646,336 | S | 10/2011 | Kelly |
| D646,337 | S | 10/2011 | Kelly |
| D646,695 | S | 10/2011 | Hoggarth |
| D653,261 | S | 1/2012 | Tomoko |
| 8,123,612 | B2 | 2/2012 | Yoshizawa |
| 8,328,619 | B2 | 12/2012 | Nagano |
| D678,323 | S | 3/2013 | Yoshida |
| D678,903 | S | 3/2013 | Yoshida |
| 8,388,435 | B2 | 3/2013 | Anderson |
| D685,033 | S | 6/2013 | Wudtke |
| 8,475,261 | B2 | 7/2013 | Little |
| D704,735 | S | 5/2014 | Hollobaugh |
| D706,741 | S | 6/2014 | Myers |
| D710,882 | S | 8/2014 | Francisco |
| D712,975 | S | 9/2014 | Lesley |
| D715,323 | S | 10/2014 | Umezawa |
| D719,615 | S | 12/2014 | Inoue |
| D719,616 | S | 12/2014 | Inoue |
| D720,771 | S | 1/2015 | Lacour |
| D728,621 | S | 5/2015 | Jou |
| D732,072 | S | 6/2015 | Ying |
| D733,088 | S | 6/2015 | Garneau |
| D736,752 | S | 8/2015 | Lee |
| D737,320 | S | 8/2015 | Mccormick |
| 9,105,147 | B2 | 8/2015 | Nagano |
| D740,888 | S | 10/2015 | Depalma |
| D741,368 | S | 10/2015 | Supino |
| D742,975 | S | 11/2015 | Myers |
| D748,123 | S | 1/2016 | Schwengler |
| 9,245,418 | B2 | 1/2016 | Mitchell |
| D751,098 | S | 3/2016 | Lim |
| D760,239 | S | 6/2016 | Hirai |
| D761,804 | S | 7/2016 | Hirai |
| D762,241 | S | 7/2016 | Loosli |
| D762,613 | S | 8/2016 | Garneau |
| RE46,169 | E | 10/2016 | Kelly |
| D769,260 | S | 10/2016 | Kim |
| D769,325 | S | 10/2016 | Casalegno |
| D771,041 | S | 11/2016 | Bae |
| D774,032 | S | 12/2016 | Bae |
| D776,157 | S | 1/2017 | Lajoie |
| D776,161 | S | 1/2017 | Tursi |
| D784,399 | S | 4/2017 | Herrera |
| D786,928 | S | 5/2017 | Lee |
| 9,679,435 | B2 | 6/2017 | Schrementi |
| D792,454 | S | 7/2017 | Baumez |
| D794,672 | S | 8/2017 | Hirai |
| D795,884 | S | 8/2017 | Kim |
| D812,146 | S | 3/2018 | Castro |
| D812,147 | S | 3/2018 | Castro |
| D812,148 | S | 3/2018 | Castro |
| D812,149 | S | 3/2018 | Castro |
| D818,048 | S | 5/2018 | Calhoun |
| D819,694 | S | 6/2018 | Kim |
| D819,747 | S | 6/2018 | Castro |
| D820,915 | S | 6/2018 | Lee |
| D822,117 | S | 7/2018 | Costa |
| D829,222 | S | 9/2018 | Choi |
| D832,355 | S | 10/2018 | Castro |
| D832,356 | S | 10/2018 | Castro |
| D832,357 | S | 10/2018 | Castro |
| D836,164 | S | 12/2018 | Castro |
| 10,181,236 | B2 | 1/2019 | Goldstein |
| D842,337 | S | 3/2019 | Pudipeddi |
| D842,930 | S | 3/2019 | Johnson |
| D842,932 | S | 3/2019 | Stair |
| D842,933 | S | 3/2019 | Castro |
| D843,458 | S | 3/2019 | Castro |
| D843,459 | S | 3/2019 | Castro |
| D843,460 | S | 3/2019 | Castro |
| D843,461 | S | 3/2019 | Castro |
| D843,464 | S | 3/2019 | Castro |
| D843,465 | S | 3/2019 | Castro |
| D843,467 | S | 3/2019 | Johnson |
| D843,468 | S | 3/2019 | Johnson |
| D843,469 | S | 3/2019 | Nettenstrom |
| D843,473 | S | 3/2019 | Zedell, Jr. |
| D843,474 | S | 3/2019 | Lesley |
| D843,475 | S | 3/2019 | Lesley |
| D843,476 | S | 3/2019 | Lesley |
| D843,477 | S | 3/2019 | Lesley |
| D843,478 | S | 3/2019 | Lesley |
| D843,479 | S | 3/2019 | Castro |
| D843,480 | S | 3/2019 | Castro |
| D843,482 | S | 3/2019 | Holland |
| D844,062 | S | 3/2019 | Lesley |
| D844,656 | S | 4/2019 | Toth |
| D846,650 | S | 4/2019 | Stair |
| D850,536 | S | 6/2019 | Stair |
| D852,830 | S | 7/2019 | Penacho |
| D862,602 | S | 10/2019 | Kariya |
| D866,667 | S | 11/2019 | Stair |
| D868,165 | S | 11/2019 | Ortiz De Viveiros |
| D868,714 | S | 12/2019 | Hodgson |
| D870,138 | S | 12/2019 | Penacho |
| D870,820 | S | 12/2019 | Urban |
| D871,419 | S | 12/2019 | Hu |
| D871,506 | S | 12/2019 | Castro |
| D871,507 | S | 12/2019 | Urban |
| D872,190 | S | 1/2020 | Zedell, Jr. |
| D877,810 | S | 3/2020 | Nelsom |
| D880,606 | S | 4/2020 | Glenn, II |
| D880,608 | S | 4/2020 | Glenn, II |
| D880,610 | S | 4/2020 | Glenn, II |
| D881,285 | S | 4/2020 | Glenn |
| D882,696 | S | 4/2020 | Lesley |
| D882,697 | S | 4/2020 | Lesley |
| D882,698 | S | 4/2020 | Lesley |
| D884,079 | S | 5/2020 | Glenn, II |
| D889,546 | S | 7/2020 | Jones |
| D890,264 | S | 7/2020 | Johnson |
| D890,265 | S | 7/2020 | Johnson |
| D890,552 | S | 7/2020 | Case |
| D890,790 | S | 7/2020 | Marks |
| D890,849 | S | 7/2020 | Johnson |
| D890,850 | S | 7/2020 | Johnson |
| D893,631 | S | 8/2020 | Glinka |
| D894,285 | S | 8/2020 | Glenn, II |
| D895,019 | S | 9/2020 | Lesley |
| D896,312 | S | 9/2020 | Castro |
| D896,313 | S | 9/2020 | Castro |
| D896,314 | S | 9/2020 | Castro |
| D896,315 | S | 9/2020 | Castro |
| D898,127 | S | 10/2020 | Bristol |
| D898,128 | S | 10/2020 | Urban |
| D902,319 | S | 11/2020 | Hohman |
| D904,522 | S | 12/2020 | Holland |
| D904,915 | S | 12/2020 | Gong |
| D905,172 | S | 12/2020 | Boese |
| D905,730 | S | 12/2020 | Newsom |
| D906,432 | S | 12/2020 | Johnson |
| D906,433 | S | 12/2020 | Abele |
| D907,120 | S | 1/2021 | Demarco |
| D907,121 | S | 1/2021 | Demarco |
| D907,122 | S | 1/2021 | Demarco |
| D907,123 | S | 1/2021 | Abele |

(56) References Cited

U.S. PATENT DOCUMENTS

| | | | |
|---|---|---|---|
| D907,125 | S | 1/2021 | Abele |
| D907,126 | S | 1/2021 | Abele |
| D907,707 | S | 1/2021 | Demarco |
| D907,708 | S | 1/2021 | Demarco |
| D907,709 | S | 1/2021 | Demarco |
| D907,710 | S | 1/2021 | Demarco |
| D907,711 | S | 1/2021 | Demarco |
| D907,712 | S | 1/2021 | Demarco |
| D907,714 | S | 1/2021 | Abele |
| D907,715 | S | 1/2021 | Abele |
| D907,716 | S | 1/2021 | Demarco |
| D908,171 | S | 1/2021 | Demarco |
| D908,172 | S | 1/2021 | Demarco |
| D908,173 | S | 1/2021 | Demarco |
| D908,712 | S | 1/2021 | Fischbach |
| D908,802 | S | 1/2021 | Holland |
| D909,399 | S | 2/2021 | La Guardia |
| D909,479 | S | 2/2021 | Abele |
| D910,117 | S | 2/2021 | Demarco |
| D910,118 | S | 2/2021 | Demarco |
| D910,119 | S | 2/2021 | Demarco |
| D910,120 | S | 2/2021 | Demarco |
| D910,761 | S | 2/2021 | Glenn, II |
| D910,762 | S | 2/2021 | Demarco |
| D910,763 | S | 2/2021 | Demarco |
| D911,451 | S | 2/2021 | Ortiz De Viveiros |
| D913,378 | S | 3/2021 | Glenn, II |
| D913,379 | S | 3/2021 | Calhoun |
| D914,808 | S | 3/2021 | Loong |
| D915,523 | S | 4/2021 | Glenn, II |
| D918,300 | S | 5/2021 | Demarco |
| D918,303 | S | 5/2021 | Demarco |
| 11,011,015 | B2 | 5/2021 | Achmueller |
| D923,102 | S | 6/2021 | Mcgahn |
| 11,132,861 | B2 | 9/2021 | Nelson |
| D934,347 | S | 10/2021 | Ocampo |
| D934,955 | S | 11/2021 | Van Linden |
| D936,150 | S | 11/2021 | Bussey |
| D937,354 | S | 11/2021 | Glenn, II |
| D937,355 | S | 11/2021 | Olive |
| D939,025 | S | 12/2021 | Bruzzese |
| 11,217,059 | B2 | 1/2022 | Onitsuka |
| D943,027 | S | 2/2022 | Ortiz De Viveiros |
| D943,028 | S | 2/2022 | Ortiz de Viveiros et al. |
| D943,029 | S | 2/2022 | Francisco |
| D944,330 | S | 2/2022 | Ortiz De Viveiros |
| D959,562 | S | 2/2022 | Edwards |
| D946,661 | S | 3/2022 | Thompson |
| 11,288,916 | B2 | 3/2022 | Coon |
| D952,751 | S | 5/2022 | Kulujian |
| D952,753 | S | 5/2022 | Kulujian |
| D952,755 | S | 5/2022 | Kulujian |
| 11,348,400 | B2 | 5/2022 | Coon |
| D954,844 | S | 6/2022 | Rosander |
| D954,845 | S | 6/2022 | Johnson |
| D958,888 | S | 7/2022 | Demarco |
| D964,471 | S | 9/2022 | Holland |
| D969,926 | S | 11/2022 | Lewis |
| D969,927 | S | 11/2022 | Lee |
| D969,928 | S | 11/2022 | Lamb |
| D974,472 | S | 1/2023 | Colvin |
| D977,014 | S | 1/2023 | Bussey |
| 2002/0119814 | A1 | 8/2002 | Fong |
| 2002/0183105 | A1 | 12/2002 | Cannon |
| 2004/0048646 | A1 | 3/2004 | Visocnik |
| 2004/0204227 | A1 | 10/2004 | Johnson |
| 2005/0043083 | A1 | 2/2005 | Inoue |
| 2005/0059475 | A1 | 3/2005 | Breen |
| 2005/0215311 | A1 | 9/2005 | Hornik |
| 2005/0282615 | A1 | 12/2005 | Englman |
| 2005/0288094 | A1 | 12/2005 | Marks |
| 2007/0287529 | A1 | 12/2007 | Kojima |
| 2010/0210343 | A1 | 8/2010 | Englman |
| 2011/0207530 | A1 | 8/2011 | Chudek |
| 2013/0116809 | A1 | 5/2013 | Carpenter |
| 2014/0094303 | A1 | 4/2014 | Wabschall |
| 2014/0256409 | A1 | 9/2014 | Wood |
| 2015/0099568 | A1 | 4/2015 | Elias |
| 2016/0086435 | A1 | 3/2016 | Hughes |
| 2016/0092065 | A1 | 3/2016 | Hilbert |
| 2016/0093143 | A1 | 3/2016 | Lamb |
| 2016/0093145 | A1 | 3/2016 | Kitamura |
| 2016/0140795 | A1 | 5/2016 | Fong |
| 2017/0039802 | A1 | 2/2017 | Prabhu |
| 2017/0061743 | A1 | 3/2017 | Itagaki |
| 2017/0092066 | A1 | 3/2017 | Watkins |
| 2017/0221313 | A1 | 8/2017 | Basallo |
| 2018/0040191 | A1 | 2/2018 | Tran |
| 2018/0053373 | A1 | 2/2018 | Goldstein |
| 2018/0075689 | A1 | 3/2018 | Castro |
| 2018/0078854 | A1 | 3/2018 | Achmueller |
| 2018/0190068 | A1 | 7/2018 | Priddy |
| 2018/0330568 | A1 | 11/2018 | Glenn |
| 2018/0342129 | A1 | 11/2018 | Wudtke |
| 2019/0012874 | A1 | 1/2019 | Goldstein |
| 2019/0066445 | A1 | 2/2019 | Satterlie |
| 2019/0096161 | A1 | 3/2019 | Barbour |
| 2019/0096166 | A1 | 3/2019 | Shimizu |
| 2019/0096170 | A1 | 3/2019 | Lewis |
| 2019/0197818 | A1 | 6/2019 | Rosander |
| 2019/0197824 | A1 | 6/2019 | Timperley |
| 2019/0244488 | A1 | 8/2019 | Marsh |
| 2019/0295380 | A1 | 9/2019 | Casey |
| 2020/0111295 | A1 | 4/2020 | Glenn |
| 2020/0111299 | A1 | 4/2020 | Baker |
| 2020/0160654 | A1 | 5/2020 | Idris |
| 2020/0327779 | A1 | 10/2020 | Sanborn |
| 2021/0110642 | A1 | 4/2021 | Ocampo |
| 2021/0134109 | A1 | 5/2021 | Hemerick |
| 2021/0322595 | A1 | 10/2021 | Colvin |
| 2022/0068081 | A1 | 3/2022 | Pariseau |
| 2022/0180695 | A1 | 6/2022 | Fritz |
| 2022/0245993 | A1 | 8/2022 | Soong |
| 2023/0024888 | A1 | 1/2023 | Ocampo |

OTHER PUBLICATIONS

Office Action dated Oct. 22, 2020 for U.S. Appl. No. 29/686,998 (pp. 1-8).

Notice of Allowance dated Nov. 4, 2020 for U.S. Appl. No. 16/379,724 (pp. 1-9).

Notice of Allowance dated Dec. 16, 2020 for U.S. Appl. No. 16/379,724 (pp. 1-2).

Office Action dated Jul. 6, 2020 for U.S. Appl. No. 16/379,724 (pp. 1-10).

Notice of Allowance dated Jan. 25, 2021 for U.S. Appl. No. 29/686,998 (pp. 1-7).

Office Action dated Feb. 23, 2021 for U.S. Appl. No. 29/686,999 (pp. 1-6).

Corrected Notice of Allowability dated Mar. 19, 2021 for U.S. Appl. No. 29/686,998 (pp. 1-2).

Torsani, Derek. "Animated Buffer Logo." Dribbble, published Mar. 31, 2015 (Retrieved from the Internet Feb. 17, 2021). Internet URL: <https://dribbble.com/shots/1998685-Animated-Buffer-Logo> (Year: 2015).

GiVe. "Remerge's CSS loader+ CodePen." Dribbble, published Nov. 24, 2014 (Retrieved from the Internet Feb. 17, 2021). Internet URL: <https://dribbble .com/shots/ 1821741-Remerge-s-CSS-loader-CodePen> (Year: 2014).

Notice of Allowance dated Apr. 28, 2021 for U.S. Appl. No. 29/686,999 (pp. 1-6).

Office Action (Non-Final Rejection) dated Sep. 27, 2021 for U.S. Appl. No. 17/079,400 (pp. 1-11).

Office Action (Non-Final Rejection) dated Sep. 23, 2021 for U.S. Appl. No. 17/248,251 (pp. 1-12).

MCFM-55-43inch Vertical Type Gaming Machine, first available Jul. 1, 2020, syweb.com [online], site visited Nov. 15, 2021], Available from internet URL: https://bit.ly/3oxvpLu (Year: 2020).

Infinity V55, first available Apr. 23, 2018, youtube.com [online], site visited Nov. 16, 2021], Available from internet URL: https://www.youtube.com/watch?v=ILy-9J6YkPo (Year: 2018).

(56) References Cited

OTHER PUBLICATIONS

Office Action (Final Rejection) dated Jan. 28, 2022 for U.S. Appl. No. 17/079,400 (pp. 1-10).
Office Action (Final Rejection) dated Feb. 24, 2022 for U.S. Appl. No. 17/248,251 (pp. 1-6).
Office Action dated Mar. 23, 2022 for U.S. Appl. No. 29/735,030 (pp. 1-10).
Office Action dated Mar. 23, 2022 for U.S. Appl. No. 29/735,035 (pp. 1-10).
Office Action dated Mar. 17, 2022 for U.S. Appl. No. 29/735,056 (pp. 1-12).
Office Action dated Mar. 23, 2022 for U.S. Appl. No. 29/735,058 (pp. 1-11).
Office Action dated Mar. 17, 2022 for U.S. Appl. No. 29/735,063 (pp. 1-12).
Office Action dated Mar. 23, 2022 for U.S. Appl. No. 29/735,065 (pp. 1-10).
Office Action dated Mar. 17, 2022 for U.S. Appl. No. 29/735,067 (pp. 1-13).
Office Action dated Mar. 17, 2022 for U.S. Appl. No. 29/735,069 (pp. 1-12).
Office Action (Notice of Allowance and Fees Due (PTOL-85) dated Apr. 6, 2022 for U.S. Appl. No. 17/248,251 (pp. 1-8).
Office Action (Notice of Allowance and Fees Due (PTOL-85) dated May 23, 2022 for U.S. Appl. No. 17/248,251 (pp. 1-2).
Office Action (Notice of Allowance and Fees Due (PTOL-85) dated Jun. 24, 2022 for U.S. Appl. No. 17/079,400 (pp. 1-8).
Office Action dated Aug. 19, 2022 for U.S. Appl. No. 29/735,030 (pp. 1-7).
"Huge new casino and resort opens near Toronto", Aug. 5, 2021, Blogto, site visited Aug. 1, 2022: https://www.blogto.com/city/2021/08/huge-new-casino-and-resort-opens-near-toronto/ (Year: 2021).
"Slot machines" Aug. 11, 2020, Encore Boston Harbor, site visited Aug. 1, 2022: ttps://www.encorebostonharbor.com/casino featured-slot-games (Year: 2020).
"How Do I Pick a Good Slot Machine" Mar. 17, 2020, BestUsCasinos, site visited Aug. 2, 2022: https://www.bestuscasinos.org/ blog/how-do-i-pick-good-slot-machine/ (Year:2020).
Office Action dated Aug. 22, 2022 for U.S. Appl. No. 29/735,035 (pp. 1-7).
Office Action dated Aug. 22, 2022 for U.S. Appl. No. 29/735,056 (pp. 1-8).
Office Action dated Aug. 22, 2022 for U.S. Appl. No. 29/735,058 (pp. 1-8).
Office Action dated Aug. 22, 2022 for U.S. Appl. No. 29/735,063 (pp. 1-7).
Notice of Allowance dated Aug. 26, 2022 for U.S. Appl. No. 29/735,065 (pp. 1-8).
Notice of Allowance dated Aug. 30, 2022 for U.S. Appl. No. 29/735,067 (pp. 1-8).
Notice of Allowance dated Aug. 29, 2022 for U.S. Appl. No. 29/735,069 (pp. 1-8).
Notice of Allowance dated Nov. 15, 2022 for U.S. Appl. No. 29/735,030 (pp. 1-7).
"Winning big bucks", Aug. 4, 2021, Youtube, site visited Nov. 1, 2022: https://www.youtube.com/watch? v=dQeaTYnkCt0 ( Year: 2021).
"Discover the Sumptuous Grand Casino Brussels VIAGE" Nov. 14, 2017, Youtube, site visited Nov. 1, 2022: https:// www.youtube.com/watch?v=LNr5WDi0-rs ( (Year: 2017).
Notice of Allowance dated Nov. 15, 2022 for U.S. Appl. No. 29/735,035 (pp. 1-7).
Notice of Allowance dated Nov. 16, 2022 for U.S. Appl. No. 29/735,056 (pp. 1-7).
Notice of Allowance dated Nov. 16, 2022 for U.S. Appl. No. 29/735,058 (pp. 1-8).
Notice of Allowance dated Nov. 14, 2022 for U.S. Appl. No. 29/735,063 (pp. 1-7).
Office Action (Non-Final Rejection) dated Apr. 25, 2023 for U.S. Appl. No. 17/664,388 (pp. 1-8).
Notice of Allowance dated May 25, 2023 for U.S. Appl. No. 29/700,719 (pp. 1-19).
Office Action (Final Rejection) dated Oct. 3, 2023 for U.S. Appl. No. 17/664,388 (pp. 1-6).

FIG. 9
723
901
709
WONDER 4 BOOST
BUFFALO
RHINO CHARGE
TRIGGERS SUPER FREE GAMES!
YOU'VE WON 15 FREE GAMES!
SELECT GAMES
CREDIT 35583
WIN 545

ELECTRONIC GAMING MACHINE WITH BASE GAMES AND UPGRADED FREE FEATURE GAMES WITH MULTIPLE VERSIONS DISPLAYED

RELATED APPLICATIONS

The present application is a continuation of and claims priority to U.S. patent application Ser. No. 17/079,400, filed Oct. 23, 2020, issued as U.S. Pat. No. 11,488,452, on Nov. 1, 2022, and entitled "Electronic Gaming Machine with Base Games and Upgraded Free Feature Games with Multiple Versions Displayed," which is a continuation application of U.S. patent application Ser. No. 15/995,021, filed May 31, 2018, issued as U.S. Pat. No. 10,818,145 on Oct. 27, 2020, and entitled "An Electronic Gaming Machine with Base Games and Upgraded Free Feature Games with Multiple Versions Displayed" which claims priority to U.S. Provisional Patent Application 62/554,402 filed on Sep. 5, 2017, and entitled "A Gaming Machine," both of which are hereby incorporated herein by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

One embodiment provides a gaming machine including a credit input mechanism configured to receive a physical item to establish a credit balance, the credit balance being increasable and decreasable based at least on wagering activity, a credit meter configured to monitor the credit balance, and a display having a plurality of display positions. The gaming machine also comprises a game controller to select a plurality of symbols, and causes the display to display the selected symbols at the display positions. The game controller is further configured to play a base game, to determine whether to trigger from the base game a feature game of normal free games, super free games, or extreme free games. During a feature game of normal free games, the game controller is further configured to upgrade the feature game to super free games and then to extreme free games for remaining feature games randomly or based on a trigger. During a feature game of super free games, the game controller is further configured to upgrade the feature game to extreme free games for the remaining free games. The game controller may be further configured to determine if an outcome of the feature game includes a win. The gaming machine also comprises a payout mechanism to cause a payout associated with the win.

Another embodiment provides a gaming machine including a credit input mechanism configured to receive a physical item to establish a credit balance, the credit balance being increasable and decreasable based at least on wagering activity, a credit meter configured to monitor the credit balance, and a display having a plurality of display positions. The gaming machine also comprises a game controller to select a plurality of symbols, and causes the display to display the selected symbols at the display positions. The game controller may be further configured to play a base game, to determine whether to upgrade the base game to a feature game of normal free games, super free games, or extreme free games. The game controller is further configured to determine if an outcome of the feature game includes a win. The gaming machine also comprises a payout mechanism to cause a payout associated with the win.

A system, machine, and/or method is provided for upgrading a feature game to another feature game, substantially as shown in and/or described in connection with at least one of the figures, as set forth more completely in the claims.

These and other advantages, aspects and novel features of the disclosure, as well as details of an illustrated embodiment thereof, will be more fully understood from the following description and drawings.

BRIEF DESCRIPTION OF THE DRAWINGS

Embodiments of the disclosure will now be described with reference to the accompanying drawings in which.

DETAILED DESCRIPTION

Figure 1:
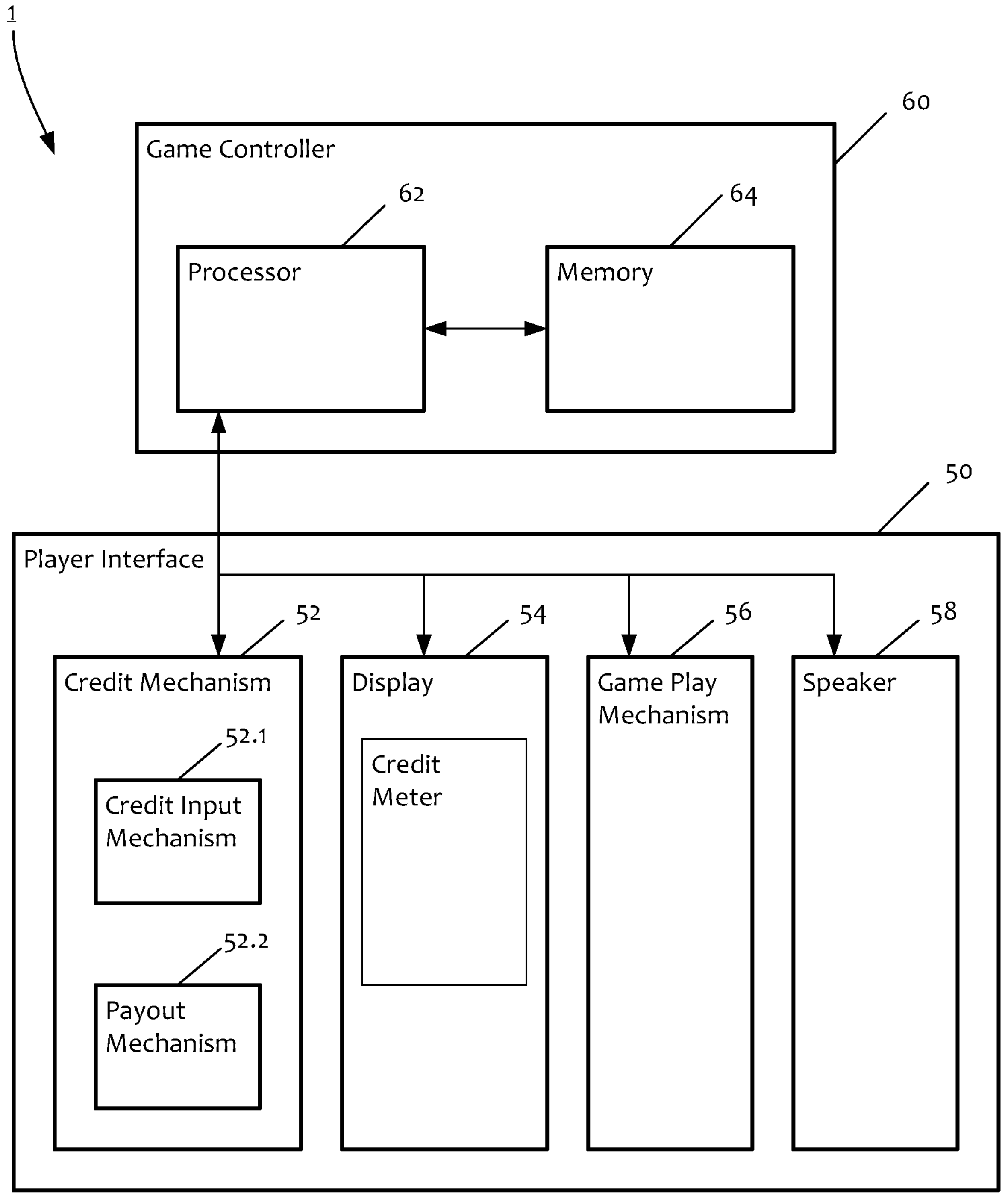
FIG. 1 is a block diagram of the core components of a gaming system.

Referring to the drawings, there is shown an embodiment of a gaming machine including a credit input mechanism configured to receive a physical item to establish a credit balance, the credit balance being increasable and decreasable based at least on wagering activity, a credit meter configured to monitor the credit balance, and a display having a plurality of display positions. The gaming machine also includes a game controller to select a plurality of symbols, and causes the display to display the selected symbols at the display positions, the game controller is further configured to play a base game, to determine whether to trigger from the base game to one of a plurality of levels of free games including one of a feature game of normal free games, super free games, or extreme free games. During a feature game of normal free games, the game controller is further configured to upgrade the feature game to super free games and then to extreme free games for remaining feature games randomly or based on a trigger. During a feature game of super free games, the game controller is further configured to upgrade the feature game to extreme free games for the remaining free games. The game controller is further configured to determine if an outcome of the feature game includes a win. The gaming machine also includes a payout mechanism to cause a payout associated with the win.

General Construction of the Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server. In contrast, a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Referring to FIG. 1, the gaming system 1 has several core components. At the broadest level, the core components are a player interface 50 and a game controller 60. The player interface 50 enables manual interaction between a player and gaming system 1, and for this purpose includes input/output components required for the player to enter instructions to play a game and observe game outcomes.

Components of the player interface may vary from embodiment to embodiment but will typically include a credit mechanism 52 to enable a player to input credits. For example, in some embodiments, credit mechanism 52 may include a credit input mechanism 52.1 to receive a physical item representing a monetary value for establishing a credit balance. The credit balance may be increasable and decreasable based on wagering activities. Based on the established credit balance, the gaming system 1 initiates a game. In some embodiments, the credit mechanism 52 also includes a payout mechanism 52.2 to cause a payout associated with the credit balance. The player interface may also include one or more displays 54, a game play mechanism 56 including one or more input devices that enable a player to input game play instructions (e.g. to place a wager), and one or more speakers 58. In some embodiments, each of the displays 54 includes a plurality of display positions. In other embodiments, each of the displays 54 includes a plurality of display areas. Each of the display areas includes a plurality of display positions. In the embodiment shown, the display 54 also includes a credit meter 54.1. In some embodiments, credit meter 54.1 displays credits available, credits bet, and/or credits won.

Game controller 60 is in data communication with player interface 50 and typically comprises a processor 62 that processes game play instructions in accordance with game play rules and outputs game play outcomes to the display(s) 54. Typically, the game play rules are stored as program code in a memory 64 but can also be hardwired. In some embodiments, the memory 64 may also store data indicative of a plurality of symbols, pay tables, images, and other information to be used in games. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2:
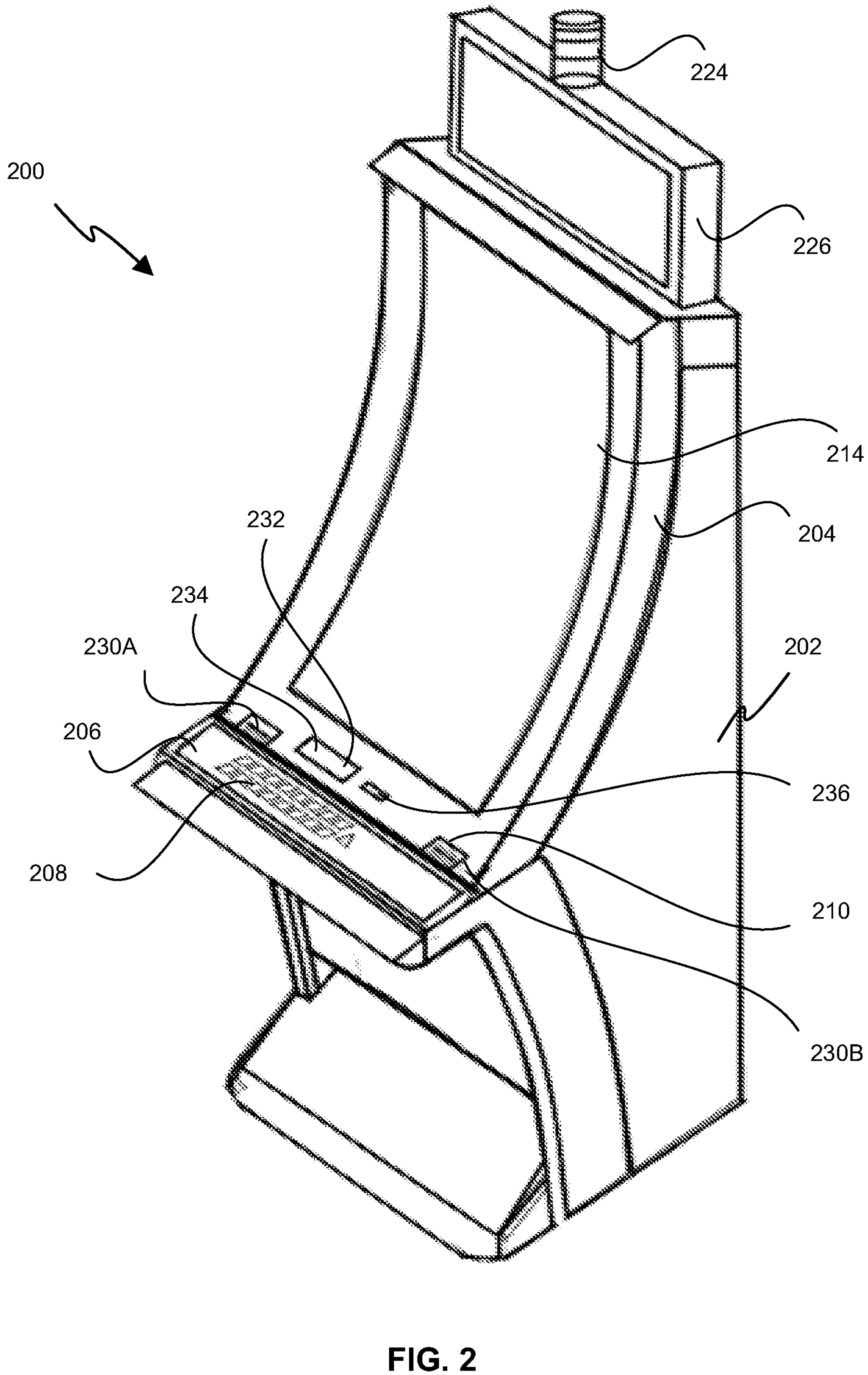
FIG. 2 is a perspective view of a standalone gaming machine.

Turning now to FIG. 2, a perspective view of a standalone gaming machine 200 is shown. FIG. 2 depicts components of the example gaming device 200.

In some embodiments, a game instance may be generated on a remote gaming device such as a server based gaming system. The game instance is communicated to gaming device 200 via network and then displayed on gaming device 200. Gaming device 200 may execute game software, such as but not limited to video streaming software that allows the game to be displayed on gaming device 200. When an instance is stored on gaming device 200, the instance may be loaded from a memory (e.g., from a read only memory (ROM)) or from the server based gaming system.

Gaming device 200 may include a topper screen 226 or another form of a top box (e.g., a topper wheel) which sits on top of cabinet 202. In addition to the components described above, either main cabinet 202 or topper screen 226 also house a number of other components which may be used to add features to a game being played on gaming device 200, including speakers 228, a ticket printer 230A which prints bar-coded tickets, a ticket reader 230B which reads bar-coded tickets, a key pad 232 for entering player tracking information, an illuminated display 234 for displaying player tracking information, a card reader 236 for receiving data and/or communicating information to and from media or a device such as a smart phone enabling player tracking. Ticket printer 230A may be used to print tickets for a cashless ticketing system 314.

Gaming device 200 may be connected over a network to a player tracking system server, which may be, for example, an OASIS® system manufactured by Aristocrat Technologies, Inc. The player tracking system server may track play for individual players so that an operator may reward players in a loyalty program. To this end, a player may use a player tracking interface to provide information from which the player tracking system server may identify the player.

While FIG. 2 provides details regarding one embodiment of the gaming device 200, aspects of the present disclosure may be implemented with gaming devices having more or fewer elements than are depicted in FIG. 2. Moreover, although the gaming system 200 shown in FIG. 2 illustrates one specific example gaming device 200, the gaming system 200 is by no means the only gaming device architecture for implementing various aspects of the present disclosure. For example, an architecture having a single processor that handles communications as well as routing computations, etc. may be used. Further, other types of interfaces and media could also be used with the gaming device 200. The communication path between components may be bus based or switch fabric based (such as a cross-bar).

Figure 3:
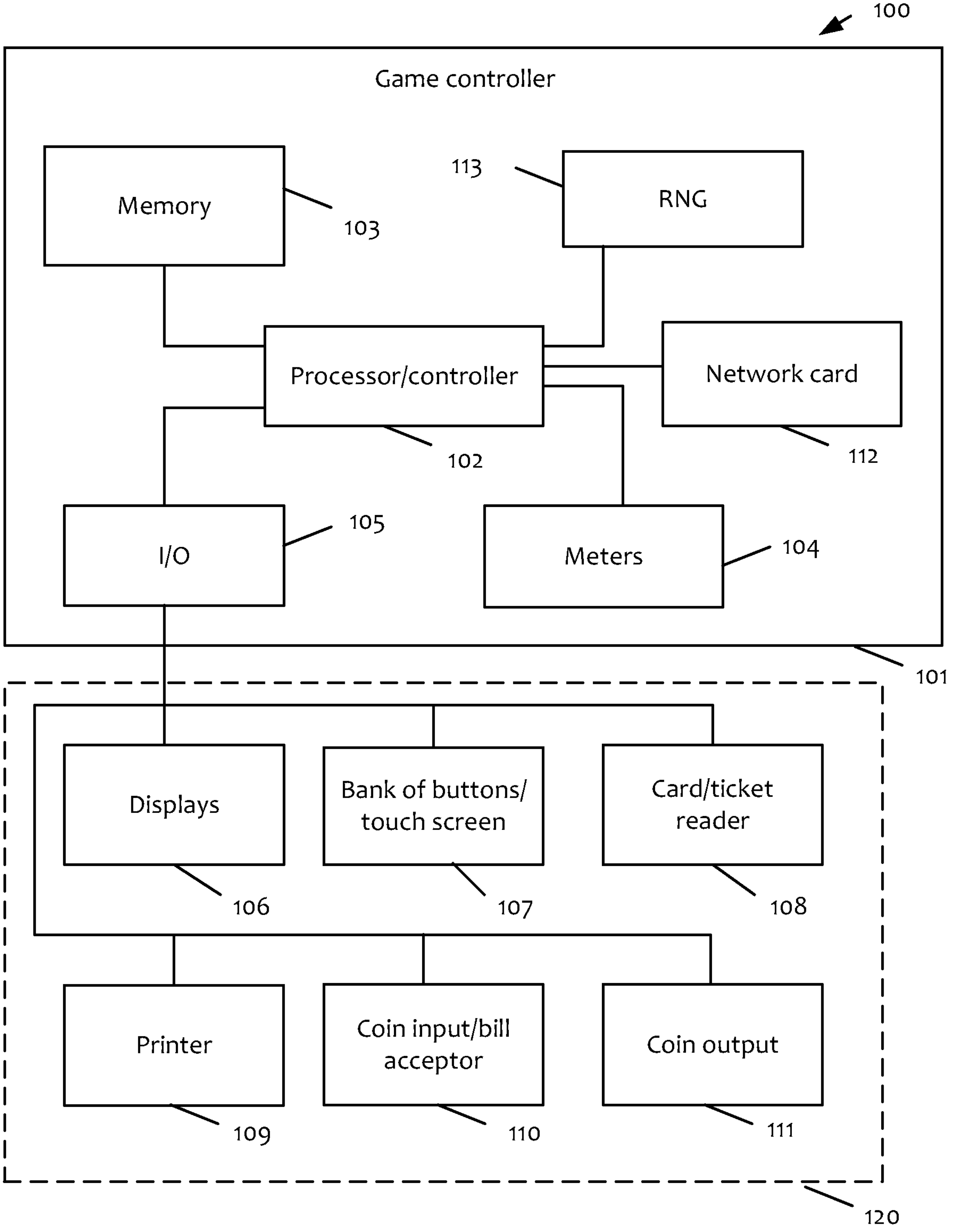
FIG. 3 is a block diagram of the functional components of a gaming machine.

FIG. 3 shows a block diagram of operative components of an example gaming machine which may be the same as or different to the gaming machine of FIG. 2.

As shown in FIG. 3, a gaming machine 100 includes a game controller 101 having a processor 102 mounted on a circuit board. Instructions and data to control operation of processor 102 may be stored in a memory 103, which is in data communication with the processor 102. Typically, gaming machine 100 will include both volatile and non-volatile memory and more than one of each type of memory, with such memories being collectively represented by the memory 103.

Gaming machine 100 has credit meters 104 for purposes including ensuring regulatory compliance and monitoring player credit, and an input/output (I/O) interface 105 for communicating with peripheral devices of the gaming machine 100. Input/output (I/O) interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the example shown in FIG. 3, a player interface 120 includes peripheral devices that communicate with game controller 101 including one or more displays 106, a touch screen and/or buttons 107 (which provide a game play mechanism), a card and/or ticket reader 108, a printer 109, a bill acceptor and/or coin input mechanism 110, and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, gaming machine 100 may include a communications interface, for example a network card 112. Network card 112 may, for example, send status information, accounting information or other information to a bonus controller, central controller, server, or database and receive data or commands from the bonus controller, central controller, server, or database. In various embodiments, employing a player marketing module, communications over a network may be via player marketing module—i.e. the player marketing module may be in data communication with one or more of the above devices and communicate with it on behalf of the gaming machine.

Figure 4:
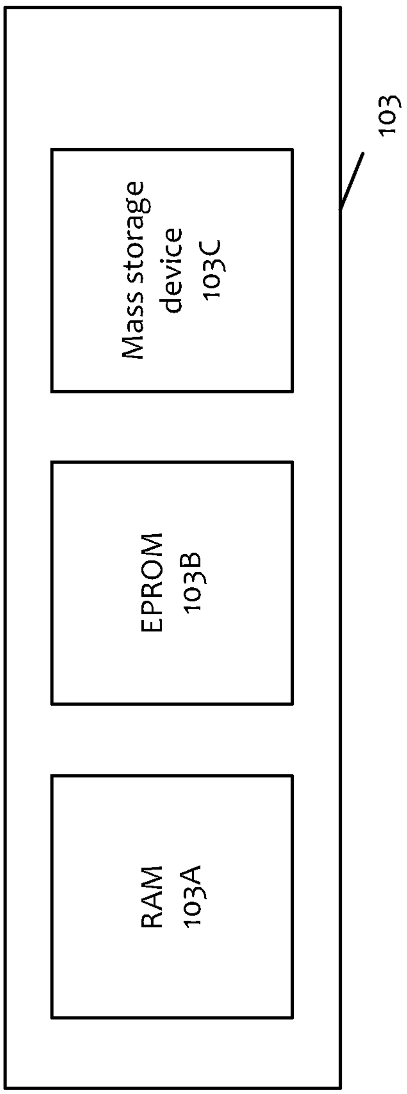
FIG. 4 is a schematic diagram of the functional components of a memory.

Referring now to FIG. 4, the main components of an exemplary memory 103 include RAM 103A, EPROM 103B, and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of which may be verified and/or authenticated by the processor 102 using protected code from EPROM 103B or elsewhere.

It is also possible for the operative components of gaming machine 100 to be distributed, for example, input/output devices 106, 107, 108, 109, 110, 111 may be provided remotely from the game controller 101.

Figure 5:
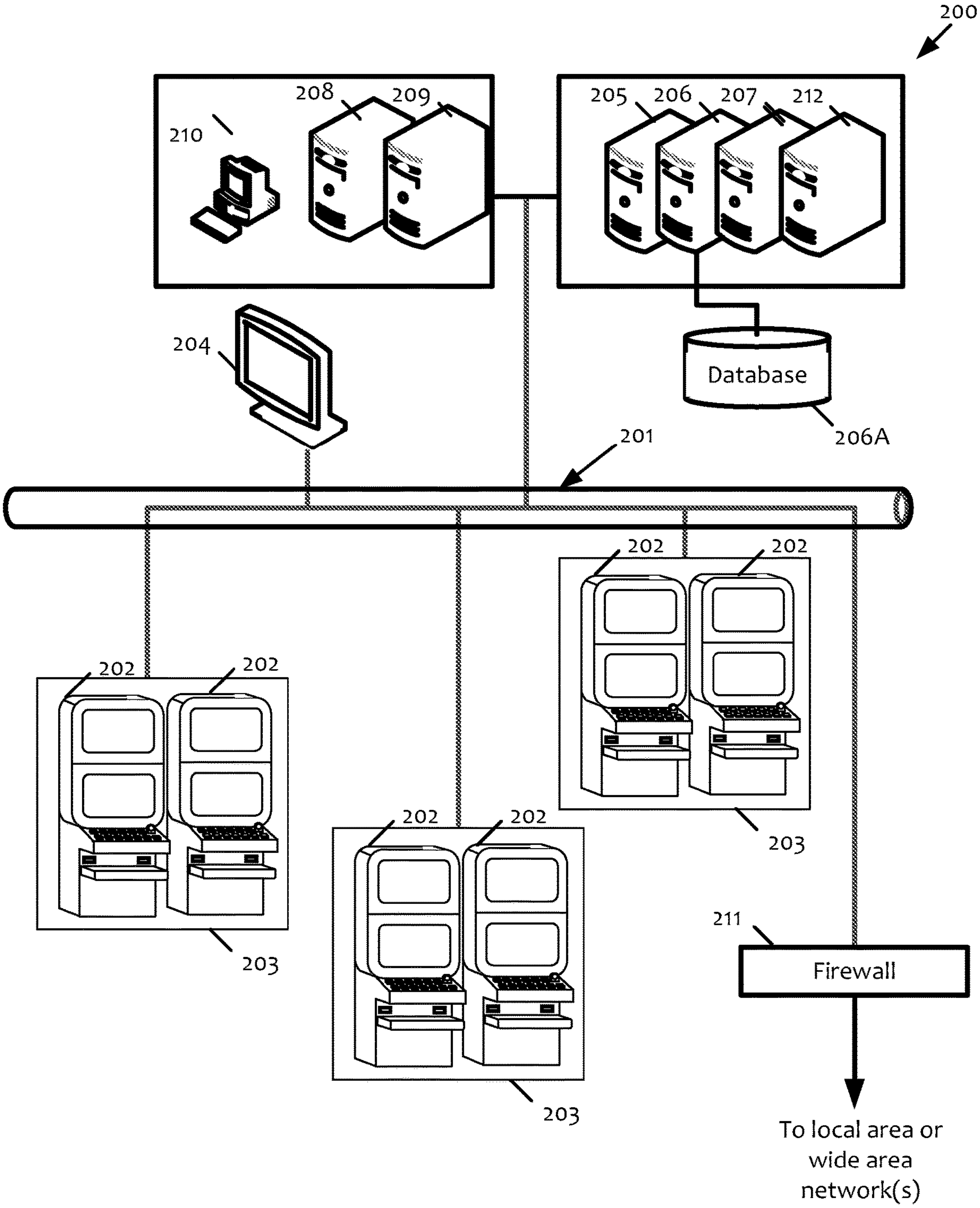
FIG. 5 is a schematic diagram of a network gaming system.

FIG. 5 shows a gaming system 200 in accordance with an alternative embodiment. Gaming system 200 includes a network 201, which for example may be an Ethernet network or other type of secure network. Gaming machines 202, shown arranged in three banks 203 of two gaming machines 202 in FIG. 5 are connected to network 201. Gaming machines 202 provide a player operable interface and may be the same as the gaming machines 10 and 100 shown in FIGS. 2 and 3, or may have simplified functionality depending on the requirements for implementing game play. While banks 203 of two gaming machines are illustrated in FIG. 5, banks of one, three, or more gaming machines are also envisaged.

One or more displays 204 may also be connected to network 201. For example, displays 204 may be associated with one or more banks 203 of gaming machines. Displays 204 may be used to display representations associated with game play on gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by gaming machines 202 in a database 206A. Typically, if the gaming system enables players to participate in a jackpot game, a jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client server configurations are possible, and further details of a client/server architecture can be found in WO 2006/052213 and PCT/SE2006/000559, the disclosures of which are incorporated herein by reference.

Servers are also typically provided to assist in the administration of the gaming system 200, including for example a gaming floor management server 208 and a licensing server 209 to monitor the use of licenses relating to particular games. An administrator terminal 210 is provided to allow an administrator to run network 201 and the devices connected to the network.

Gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

When the credit input mechanism 52.1 (of FIG. 1) has received a physical item representing a monetary value, a credit balance is established. The player may then operate the game play mechanism 56 (of FIG. 1) to specify one or more of a plurality of wagers for the base game and to initiate a play of the base game. In an example embodiment, at least certain of the wagers that the player can wager entitles the player to win a chance to play a feature game, for example, when a trigger condition occurs. In some embodiments, when the credit input mechanism 52.1 (of FIG. 1) has received a physical item representing a monetary value for establishing a credit balance, at least a portion of the received physical item may initiate a play of the base game directly.

Figure 6A:
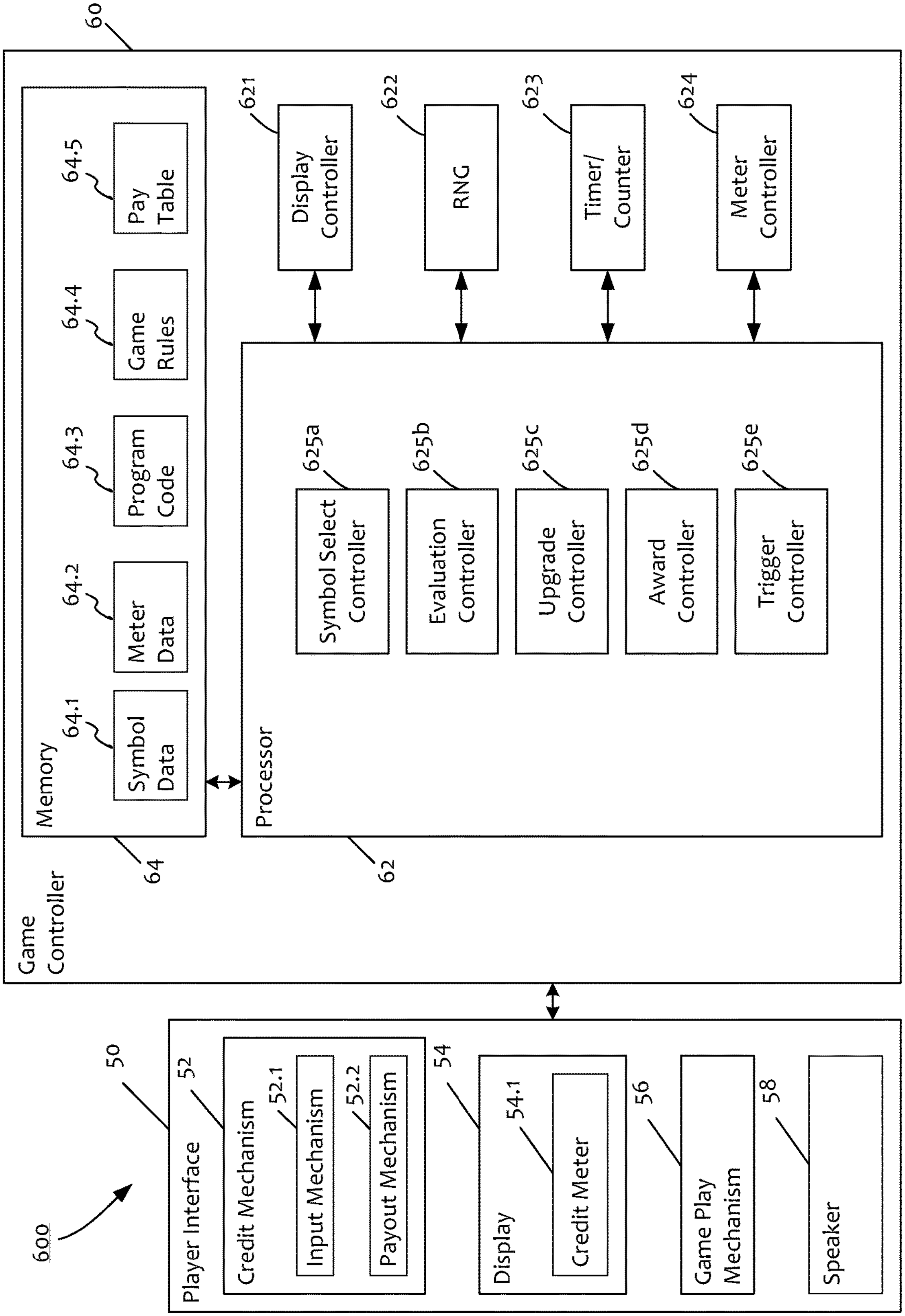
FIG. 6A is an exemplary gaming machine in block diagram form.

Referring to FIG. 6A, a gaming machine 600 (similar to the gaming machine 10 of FIG. 2) comprises a game controller 60. Game controller 60 includes a processor 62 and a memory 64. Memory 64 includes a symbol memory module 64.1 that stores data of a plurality of symbols, a meter memory module 64.2 that stores meter data of gaming machine 600, and a program code memory 64.3 that stores program code to implement a number of modules to be executed by processor 62. In the embodiment described, memory 64 also includes a game rule memory module 64.4 that stores a plurality of game rules that specify how a game is played. Memory 64 also includes a pay table memory module 64.5 that stores a plurality of pay tables. For example, the pay tables may specify an award when an optimum overall winning combination is obtained.

Persons skilled in the art will appreciate that some or all of the components of the game controller 60 could be alternatively implemented. For example, in some embodiments, the game controller 60 and its components are implemented in the form of a dedicated circuit, or an individual application-specific-integrated-circuit (ASIC). In other embodiments, game controller 60 and its components is implemented as an individual ASIC. In other embodiments, some or all of the game controller components may be individually or collectively implemented as software modules, controllers, and/or circuitries.

In an example embodiment, game controller 60 includes a display controller 621 which is configured to control display 54, a random number generator (RNG) 622 configured to generate a random number, and a timer/counter 623 configured to time and/or count an amount of time and/or a number of games that a base game and/or a feature game has been played, for example, without a win, an upgrade, and/or a trigger event. Game controller 60 also includes a meter controller 624 configured to generate, monitor and/or maintain meter data, for example, for display or storage based on game play, and/or to read meter data from the meter data memory module 64.2.

In the embodiment shown, the processor 62 includes a symbol select controller 625*a* that communicates with the display controller 621, the RNG 622, the timer/counter 623, and/or the meter controller 624. In some embodiments, the symbol select controller 625*a* randomly selects symbols from the symbol data memory module 64.1 for display on the display 54 via the RNG 622. The display controller 621 then causes the display 54 to display the selected symbols at a plurality of display positions. The displayed symbols thus form an outcome from the symbols displayed at the display positions.

In the embodiment shown, the processor 62 includes an evaluation controller 625*b* that evaluates the symbols selected for display to determine if the selected symbols form a winning outcome. The processor 62 also includes an upgrade controller 625*c* that upgrades a feature game to another feature game. The processor 62 also includes an award controller 625*d* to determine an award to be paid based on data in the pay table memory module 64.5, for example, via the payout mechanism 52.2, and a trigger controller 625*e* to determine if a condition is met based on, for example, symbols displayed on the display 54, a predetermined number of times a game has been played, or a predetermined number of reel spins taken place as monitored by the timer/counter 623.

Game Layout

Figure 6B:
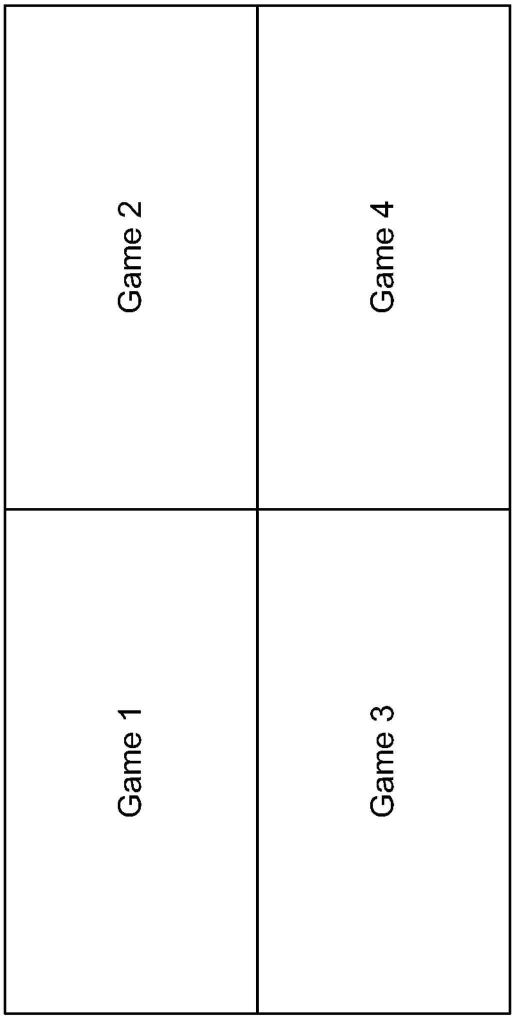
FIG. 6B illustrates the game screen layout.

FIG. 6B illustrates the game screen layout, in accordance with an example embodiment. The upgraded feature game is generally a multi-game multi-play game including four game titles. In some embodiments, the display 54 may display the base games as shown in FIG. 6B In other embodiments, the display 54 may display the base games differently. For each one of game 1, game 2, game 3 and game 4, a player may choose to play one of the games listed on the display 54.

Reel Spin

Wonder 4 Boost is a multi-game EGM that allows play of up to 8 simultaneous game instances. Wonder 4 Boost includes the normal base games and free games for the selectable games; and adds the upgraded features of super free games (4 instances) and extreme free games (8 instances). In the base game, reels of different games stop from game 1 to game 4. That is, first all reels of game 1 stop then the next game and so on. Reel stop sounds may be disabled, except when force stopping the reels. During base game play, a reel spin tune may be played while reels are spinning. Potential trigger animation and sound or sounds may be played on feature trigger symbols when there is a potential to trigger or retrigger free games, super free games, or extreme free games.

When playing less than four base games, only a feature game of normal free games can be triggered. When playing four base games, a feature game of normal free games, super free games, or extreme free games can be triggered from one or more of the base games. During normal free games, the feature game can be upgraded to a feature game of super free games and then to a feature game of extreme free games for the remaining feature games. During super free games, the feature game can be upgraded to a feature game of extreme free games for the remaining free games.

In some embodiments, the base game and/or feature game may include Buffalo, Whales of Cash, Rhino Charge, and Wild Ameri'coins. In other embodiments, the base game may include other combinations of base games. The base game and/or feature game may be based on Helix and 4K Arc Single cabinets. The games and cabinets are produced by Aristocrat™. In some embodiments, based on jurisdictions, players may play all four base games at once to qualify for a chance to upgrade. In other embodiments, players may play any number of base games to qualify for a chance to upgrade.

In an example scenario, reel spin timings comprise a) bought game: 1 game, 2 games, 3 games, 4 games, b) free games, c) super free games, and d) extreme free games.

Game Rules

A player can choose to play one game, two games, three games, or four games. Unplayed games may be dimmed and the player can choose a bet multiplier, where all wins may be multiplied by the bet multiplier.

To change game titles, a button on the game machine 100 or displayed on the game play interface 56 may be pressed on the game play interface 56, for example, a "SELECT GAMES" button and the desired titles may be dragged to where it is desired that they be played. When playing less than four games, all triggering symbols may be normal triggering symbols.

When playing four games, all triggering symbols in the base game can be either normal triggering symbols, super triggering symbols, or extreme triggering symbols. Independently for each reel window, at the beginning of every base game reel spin, a weighting table is used to determine whether all the triggering symbols for that game window will be normal, super, or extreme. In an example scenario, normal triggering symbols will trigger free games, super triggering symbols will trigger super free games, and extreme triggering symbols will trigger extreme free games. During free games, super free games, and extreme free games, triggering symbols may be a normal symbol type.

When more than one feature game is triggered on the same base game spin, all of the free game features may be played first, followed by all super free game features, and finally all extreme free games features in order of game number.

After each played feature the game transitions back to base game, if more than one feature was triggered, the banner for the feature which played may be removed, and the next feature may then be played. Game themed trigger banners may be used.

When in the base game screen, the banner associated with the feature to be played next may be highlighted individually or distinctly from banners for other features, and include the verbiage "Press Start Feature". The game may transition once a button on the game play interface 56, for example, a "Start Feature," is pressed. During free games, the games remaining message line may state "Free Game X of Y," for example.

During Super Free Games, the games remaining message line may state "Super Free Game X of Y," and during Extreme Free Games, the games remaining message line may state "Extreme Free Game X of Y."

Upon retrigger, the message line may update immediately after the retrigger bell is played. The last game may display "Free Game Y of Y."

Game Selection Screen

To go into a game selection mode, a button on the game play interface 56 may be touched, for example, a "SELECT GAMES" button, with an accompanying sound.

If the game has zero credits, the selection menu may be shown automatically when credit is inserted. When the selection menu is up, the top screen may show a graphic on how to change the game selections. To lock in a game in a particular window, any game title may be dragged and dropped to any one of the four windows, and result in an accompanying sound.

Reels may update on making any game change. As soon as any changes have been made, all win animations may stop. This also applies to changing the number of games played by pressing the corresponding button. There is no need to restore winning animations upon reselecting the previous game configuration.

A button on the game play interface 56 may be pressed, such as an "EXIT" button, for example, to exit the menu or a "Play" button may be pressed to exit the menu and play next game.

Feature Upgrade

When playing four games, it is possible to upgrade free games to super free games and super free games to extreme free games. Each time at least one trigger symbol appears in either free games or super free games, an animation plays to show 'coins' flying from all of the scatter symbols appearing to the 'pot'. There is then a 1 in x chance of upgrading the feature. Note that Rhino Charge does not have a trigger symbol; the coins flying animation is triggered randomly for this game. Thus, there are three possible cases that may happen on every spin in this example: (a) No coin flying up, (b) A coin flying up but no feature upgrade; or (c) A coin flying up and feature is upgraded. The sum of the weights of case 1 and 2 is equal to the weight of "false" option in the math combination. Only the "true" option triggers the feature upgrade (case (c)).

If the feature game is upgraded, a sound and animation plays from the pot after the last coin hits the pot. If the feature game is upgraded, after win increment for that game is complete, the game transitions to the next level of feature. The remaining games are played at the new feature level. When transitioning from free games to super free games, the game specific feature tune may seamlessly continue across the transition.

When transitioning from super free games to extreme free games, the game specific feature tune is replaced with a generic extreme free games tune that is common to all four games.

After transitioning to super free games or extreme free games, the reels on all reel windows may already be spinning. The time until the first reel stops for the first feature game after transitioning may be extended and forced reel stop may not be enabled until all reels are clearly in view (i.e. after any transition animation has completed).

If a feature is upgraded and there are no more feature games to play (including any retrigger that may have also occurred on that spin), a bonus feature game may be awarded in this example. Another bonus game may be awarded if the feature is upgraded again, and no more feature games remain.

If a bonus game is awarded, after the screen has transitioned to the upgraded feature, a bonus feature game banner appears. The free game X of Y, super free game X of Y, or extreme free game X of Y message line may update to free game X of Y+1, super free game X of Y+1, or extreme free game X of Y+1 (respectively) immediately after the bonus feature game banner is removed.

In some embodiments, a typical base game may have a predetermined symbol, such as, for example, <coin> is a trigger symbol that is used for a feature upgrade. While a coin is described in this example as a trigger symbol for example game Wild Ameri'coins, other trigger symbols may be used as they correlate to each of the individual games.

Base game trigger when playing four games, which is described as Wild Ameri'coins for this example, the same process applies to other games, albeit with different trigger symbols: When playing four games (regardless of which games are being played), for each base game spin there will first be a probability of all Wild Ameri'coins games triggering the extra bonus wilds feature. This probability is not dependent on how many of the 4 games have been selected as Wild Ameri'coins. If the 'all window trigger' is false, each Wild Ameri'coins window is then evaluated separately for a single window trigger. This second evaluation may result in any number of Wild Ameri'coins windows triggering the extra bonus wilds feature. This probability is different to the 'all windows trigger' probability, but is not dependent on how many of the four games have been selected as Wild Ameri'coins. The extra bonus wilds feature tune may play during the extra bonus wilds feature. After all wilds have been added, the tune may fade back into the standard wonder four base game reel spin tune.

Base game trigger when playing three games: When playing less than four games, for each base game spin, each Wild Ameri'coins window is evaluated separately for a 'single window trigger'. This may result in any number of Wild Ameri'coins windows triggering the extra bonus wilds feature. Inactive games that have been selected as Wild Ameri'coins may never evaluate or trigger the extra bonus wilds feature. Extra bonus wilds feature tune may play during the extra bonus wilds feature. After all wilds have been added, the tune may fade back into the standard wonder 4 base game reel spin tune. Again, while Wild Ameri'coins is described in this example, the same triggering process, with different triggering symbols, may be utilized for any of the games.

Free game trigger: For each free game spin, there is a free games probability of triggering the extra bonus wilds feature. Probabilities may be separated for free games playing one to three and free games playing four games.

Super free games or extreme free games trigger: For each super free game or extreme free games spin, there will first be a probability of all windows triggering the extra bonus wilds feature. There are different probabilities for super free games and extreme free games. If the 'all window trigger' is false, each window is then evaluated separately for a 'single window trigger'. This second evaluation may result in any number of windows triggering the extra bonus wilds feature. This probability is different to the 'all windows trigger' probability, and is also dependent on super free games or extreme free games.

Free Games Feature

In an example scenario, free games may be played for the triggering game only, on one reel window only. After start feature is pressed, the game transitions to the Free Games Feature and the background becomes game themed. If playing four games, a 'pot' animates on the top screen.

When playing four games, each time at least one trigger symbol appears during the free games, an animation plays to show 'coins' flying from all of the scatter symbols appearing to the 'pot'. For example, there is then a 1 in x chance of upgrading the free games to super free games for the remaining feature games, as described herein.

A feature game can be retriggered during the feature game. During free games, the triggering game feature tune, win rollups, and end tag may be played. When the feature ends, the game transitions back into the base game layout.

During free games, game X and game bet YY appear. X is the game number of the base game that triggered the feature game. YY is the bet value of the base game that triggered the feature game.

In one example, free games trigger on 3, 4, or 5 of a kind of a predetermined symbol, e.g., a <coin> symbol, and in turn, triggers 8, 15, or 20 free games, respectively. A free games feature may trigger on 3, 4, or 5 of a kind <money bag> symbols, which may trigger 10, 15, or 25 free games, respectively. In another example, when playing four games, 3, 4, or 5 of a kind <super money bag> symbol triggers 10, 15, or 25 super free games, respectively. Every 3, 4, or 5 of-a-kind of a predetermined symbol, for example, a <rhino> symbol win triggers 8, 12, or 16 free games, respectively. Super free games may also be played when upgrading the feature from free games.

In another example scenario, 3, 4, or 5 of a kind of a predetermined symbol, such as, for example, a <dollar sign> symbol triggers 7, 10, or 20 free games respectively. If a <blue dollar sign> symbol substitutes in win, the total number of free games triggered is multiplied by 2, 3, or 5. When <blue dollar sign> substitutes in win, a <blue dollar sign> symbol will animate, accompanied with sound, to reveal the free games multiplier.

In yet another example scenario, free game reels are used and a buffalo themed background may be shown. The upgrade pot is animated in the top screen if playing four games. If there is a win, each <SUNSET> that lands on screen will award a multiplier of 2 or 3. The multiplier may be determined independently for each <SUNSET> on screen and the multiplier will multiply the total win for that spin.

If more than one <sunset> lands on screen, the multiplier will be revealed one at a time from left to right, where a sound for each sunset finishes before the next sunset is animated. A sound may play with the animation to reveal <sunset x2> or <SUNSET x3>. In one example, any 2, 3, 4, or 5<coin> awards 5, 8, 15, or 20 more feature games, respectively.

Anytime a scatter lands, whether or not it has the potential to retrigger, it may play a 'coin' animation to the 'pot'. The animation may play at the time the scatter lands. After a win increment is complete, there is a chance of upgrading to super free games.

In an example scenario, free game reels are used and a "Whales of Cash" themed background is shown. The upgrade pot animates in the top screen if playing 4 games. Any win with a <whale> substituting on reel 2 or 4 is multiplied by 4. Any win with a <whale> substituting on reels 2 and 4 is multiplied by 16. In addition, 3, 4, or 5 left-to-right scatters may award another 10, 15, or 25 feature games, respectively. Any time a scatter lands, whether or not it has the potential to retrigger, it may play a 'coin' animation to the 'pot'. The animation may play at the time the scatter lands. After win increment is complete, there is a chance of upgrading to super free games.

In another example embodiment, free game reels are used and a Wild Ameri'coins, or other feature game, themed background is shown. Upgrade pot animates in the top screen if playing four games. During the free games there is an increased chance of triggering the extra bonus wilds feature. There are different weightings for the feature, but the process is the same. Anytime a trigger symbol lands, whether or not it has the potential to retrigger, it may play a 'coin' animation to the 'pot'. The animation may play at the time the trigger symbol lands. After win increment is complete, there is a chance of upgrading to super free games.

In yet another example embodiment, free game reels are used (2 reel sets for feature 2, another 2 for feature 3), and a rhino charge themed background may be shown. An upgrade pot animates in the top screen if playing 4 games. Every 3, 4, or 5 of a kind of a predetermined symbol, for example, a <rhino> symbol win triggers another 8, 12, or 16 feature games, respectively. In any free game, there is a random chance of a 'coin' animation playing to the 'pot'. After the win increment is complete, there is a chance of upgrading to super free games.

Animation and Sound

In an example embodiment, when a Whales of Cash feature game is triggered, a standard feature bell sound may be played, followed by a banner that shows that feature has been triggered. Whales of Cash themed feature music is played throughout the feature and when the feature is retriggered, a double bell sound is played. The feature wild <whale> sound may be utilized for the feature game.

In an example embodiment, when a Wild Ameri'coins feature is triggered, a standard feature bell sound is played, followed by a banner that shows that the feature has been triggered. Wild Ameri'coins themed feature music is played throughout the feature. When the feature is retriggered, a double bell sound is played.

Animation/sound order for coinciding events after the reels have stopped may be as follows: Jackpot bell for a retrigger, Wild <whale> sound, Win tunes, Super free games, and Super free games trigger.

A banner showing the total amount of free games won appears. Triggering lines are then shown individually starting from line 1 to line 30. When each line is shown, the triggering symbols animate in one loop with: Sound or banner animation (indicating how many free games have been won so far). After the last triggering line is shown, the win meter increments. At the end of increment, a banner appears prompting to start free games, or if the number of free games is at least twenty, then a feature selection screen appears (with sound). The banner showing the total amount of free games won disappears after the win increment (for <20 free games won) or after feature has been selected.

Animation and sound order for coinciding events after the reels have stopped may be as follows: Jackpot bell for a retrigger, Wild <tree> sound, Free game evaluation animation, and Win tunes.

Rhino charge themed feature music is played throughout the feature. When a feature is retriggered, a double bell sound is played. Wild <tree> sound for feature game.

Up to 480 free games can be triggered in 1 spin with 30 lines (30×16 free games=480 free games). If 20 or more free games have been won, the player qualifies for feature selection, which they may then choose between:

Feature 1—Forfeit the free games and receive a credit prize. The credit prize can be any amount between the minimum and the maximum (inclusive) as shown on the screen. The credit prize may range between 5 and 225 credits for each free game awarded, multiplied by the bet multiplier.

Feature 2—Play the number of free games awarded.

Feature 3—Play a reduced number of free games (as shown on screen) with larger stacks.

Super Free Games Feature

In an example scenario, super free games feature is only available when playing four games and will be played for the triggering game only, on four reel windows. After a start feature is pressed, the game transitions to the super free games feature and the background becomes game themed, while the 'pot' on the top screen animates.

Each time at least one trigger symbol appears during the super free games, an animation plays to show 'coins' flying from all of the scatter symbols appearing to the 'pot'. For example, there is then a 1 in x chance of upgrading the super free games to extreme free games for the remaining feature games. When the feature ends, the game transitions back into the base game layout.

During super free games, game X and game bet YY appear on the window that triggered the feature game. X is the game number of the base game that triggered the feature game. YY is the bet or wager of the base game that triggered the feature.

Super free games trigger may be triggered when playing four games, 3, 4, or 5 of a kind of a predetermined symbol, for example, <super coin> triggers 8, 15, or 20 super free games, respectively. Super free games can also be played when upgrading the feature from free games.

Super free games trigger: When playing four games, 3, 4, or 5 of a kind of a predetermined symbol, such as, for example, a <super dollar sign> symbol triggers 7, 10, or 20 super free games, respectively. If a <super dollar sign> symbol substitutes in a win, the total number of free games triggered is multiplied by 2, 3, or 5. When a <super dollar sign> symbol substitutes in a win, a <super dollar sign> symbol will animate, accompanied by a sound, to reveal the free games multiplier. If a <super dollar sign> symbol occurs underneath a <coin> symbol, the reveal animation will be played first, follow by alternating the final state of the <super blue dollar sign> symbol and <coin> symbol. Super free games can also be played when upgrading the feature from free games.

Super free games trigger: When playing four games, every 3, 4, or 5 of-a-kind <super rhino> win triggers 8, 12, or 16 super free games, respectively. Super free games can also be played when upgrading the feature from free games.

In a super free games situation, super free game reels are used and game behavior is the same as free games except: four reel windows are played, extreme free games; extreme free games trigger, when playing four games, 3, 4, or 5 of a kind of a predetermined symbol, for example, an extreme money bag symbol triggers 10, 15 or 25 extreme free games, respectively. Extreme free games can also be played when upgrading the feature from super free games.

Extreme Free Games Feature

An extreme free game may trigger in certain scenarios. For example when playing four games, 3, 4, or 5 of a kind of a predetermined symbol, for example, or an extreme free games trigger, e.g., every 3, 4, or 5 of-a-kind <extreme coin> symbol, triggers 8, 15, or 20 extreme free games respectively, or every 3, 4, or 5 of-a-kind <extreme dollar sign> symbol, which triggers 7, 10, or 20 extreme free games, respectively, or every 3, 4, or 5 of-a-kind <extreme rhino> win triggers 8, 12, or 16 extreme free games, respectively.

Extreme free games may also be played when upgrading the feature from super free games. If an <extreme dollar sign> symbol substitutes in a win, the total number of free games triggered is multiplied by 2, 3, or 5. When <extreme blue dollar sign> substitutes in a win, an <extreme blue dollar sign> symbol may animate, accompanied with sound, to reveal the free games multiplier. If an <extreme blue dollar sign> symbol occurs underneath a <coin>, the reveal animation will be played first, followed by alternating the final state of the <extreme blue dollar sign> symbol and <coin> symbol. Extreme free games can also be played when upgrading the feature from super free games.

Extreme free games may be played for the triggering game only, on eight reel windows. Four windows played on the top screen and four windows played on the main screen. A generic extreme free games feature tune and win roll up may play for extreme free games. After start feature is pressed, the game transitions to the extreme free games feature. The pot does not animate during extreme free games, and there is no special 'coin' animation to play from the trigger symbols as there is no further upgrade available. When the feature ends, the game transitions back into the base game layout.

During extreme free games, game X and game bet YY appear on the window that triggered the feature. X is the game number of the base game that triggered the feature. YY is the bet or wager of the base game that triggered the feature.

In an extreme free game scenario, extreme free game reels are used and game behavior may follow the same as free games except: a) eight reel windows are played, b) the upgrade pot does not animate, c) scatters or trigger symbols do not play the 'coin' animation to the upgrade pot, and the feature tune, win rollup, and end tag used is a generic extreme free games feature tune.

In some embodiments, a predetermined symbol, for example, a <money bag> symbol may be the trigger symbol that is used for feature upgrade. In some embodiments, each reel may comprise dynamic stacks, which can be replaced by all symbols except wilds and scatters. The dynamic stack will be the same symbol on all reels per spin. Each window will determine which symbol to use independently. Selection may be determined by a weighting table.

Feature Selection Screens

Figure 6C:
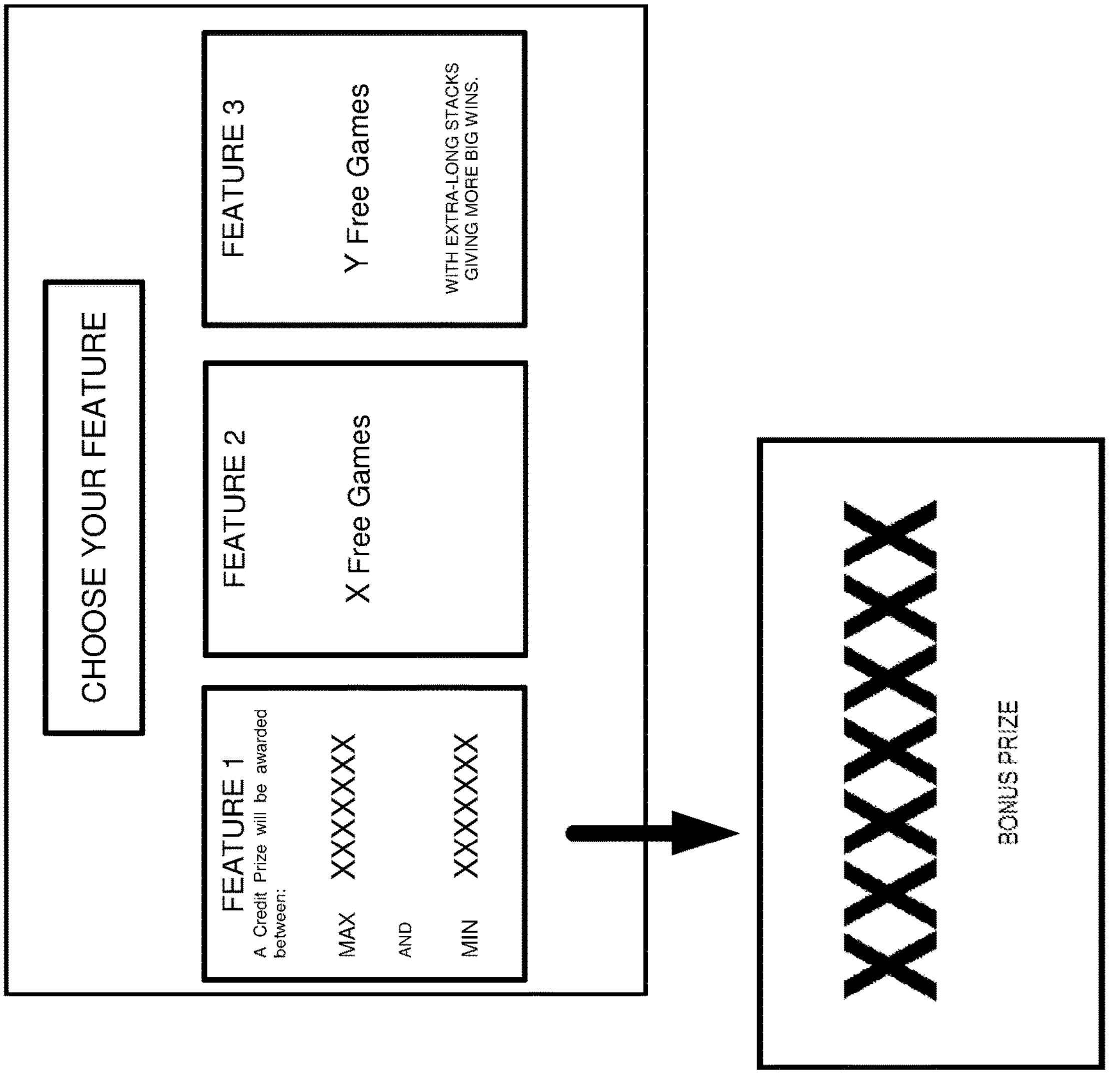
FIG. 6C illustrates the feature selection screen from initial trigger for free games.

FIG. 6C illustrates the feature selection screen from initial trigger for free games. If feature 1 is selected, a new screen appears, as indicated by the arrow pointing down from feature 1 in FIG. 6C, with a credit prize reveal (accompanied by sound). Prize will be worked out with a formula based on the number of games to be played. The number of 'X's' that appear match the size of the maximum win available that was displayed in the feature selection screen. All 'X's' are animated randomly changing between any digit from 0 to 9. From right to left each 'X' is stopped to reveal the actual digit to be paid. Once the prize is revealed, win increment with standard tunes plays. After increment the screen reverts back to the base game.

Feature 2 or 3: The screen transitions back to the reel strips with bonus reels in play banner appearing (feature reel strips used), the free games start automatically with a feature tune. If feature 3 is played there is a different bevel color.

In an example scenario, feature 3 is played with a different set of dynamic reels. Given a number x of free games awarded, if the player selects feature 3, they are awarded a number of low return to player and high return to player free games. The total number y of free games is equal to x/4. The total number of feature 3 free games is displayed to the player. In the event of retriggers, the same events (as in a bought game) take place except that players are not prompted to start free games nor is there a feature selection screen. Instead the free games message line is updated automatically with the extra free games. 8, 12, or 16 free games are won with each 3, 4, or 5 <rhino> line win, respectively. The banner and screen then fade back into the original bought game.

In the feature selection screen, if 20 or more super free games have been won, the player qualifies for feature selection, and may choose between:

Feature 1

Forfeit the super free games and receive a credit prize. The credit prize can be any amount between the minimum and the maximum (inclusive) as shown on the screen. The credit prize is between 15 and 675 credits for each super free game awarded, multiplied by the bet multiplier.

Feature 2

Play the number of super free games awarded.

Feature 3

Play a reduced number of super free games (as shown on screen) with larger stacks.

Figure 6D:
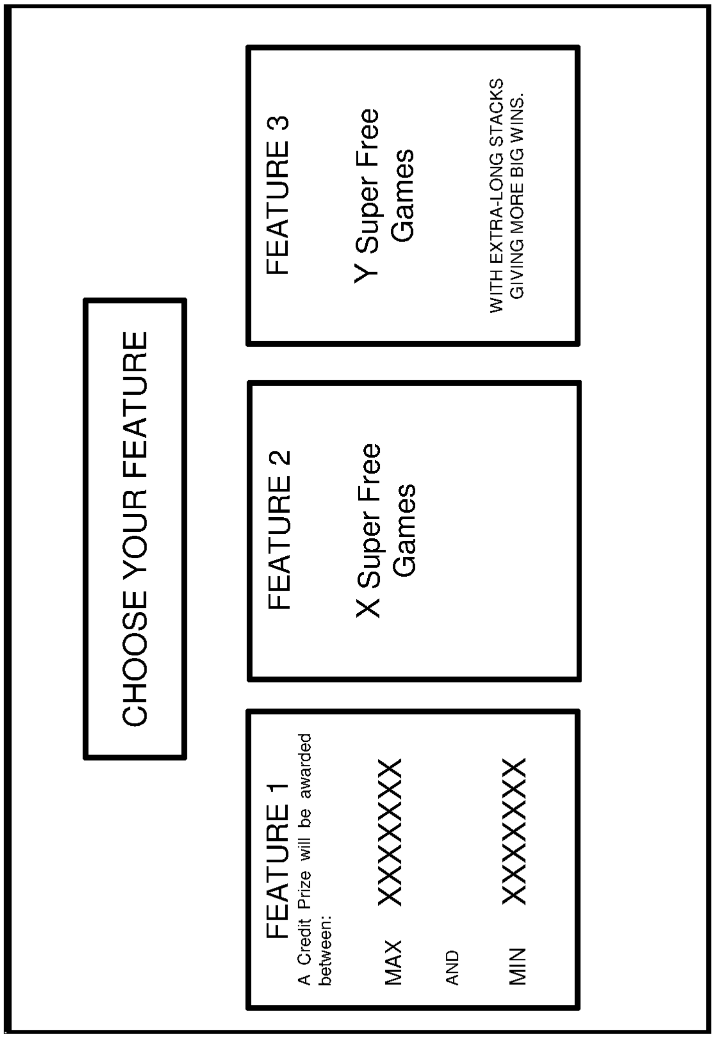
FIG. 6D illustrates the feature selection screen from initial trigger for extreme free games.

FIG. 6D illustrates the feature selection screen from initial trigger for super free games. Feature selection screen: if 20 or more extreme free games have been won, the player qualifies for feature selection, and may choose between:

Feature 1

Forfeit the extreme free games and receive a credit prize. The credit prize can be any amount between the minimum and the maximum (inclusive) as shown on the screen. The credit prize is between 25 and 1100 credits for each extreme free game awarded, multiplied by the bet multiplier.

Feature 2

Play the number of extreme free games awarded.

Feature 3

Play a reduced number of extreme free games (as shown on screen) with larger stacks, from the initial trigger for extreme free games.

Figure 6E:
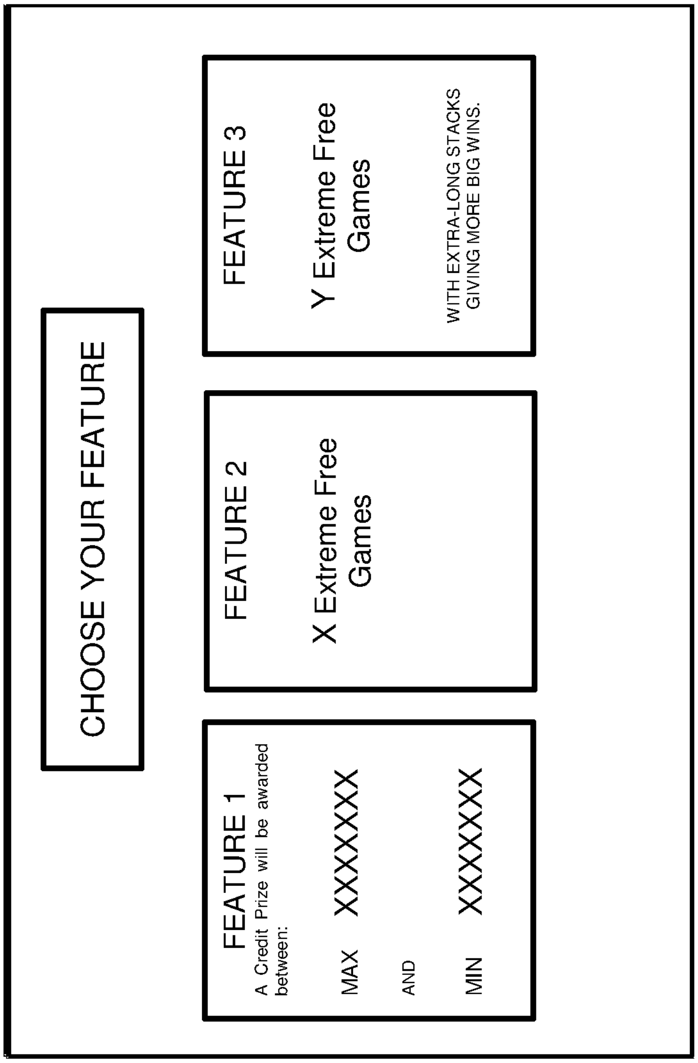
FIG. 6E illustrates the feature selection screen from initial trigger for extreme free games.

FIG. 6E illustrates the feature selection screen from initial trigger for extreme free games.

A summary of the messages displayed and associated parameters for the various games is shown below in Table 1.

TABLE 1

| # | Message | When is it displayed? | What are the parameters/variables? | When is it removed? |
|---|---|---|---|---|
| 1 | You've Won X Free Games! | When a game with Buffalo triggers the Free Games | X is the number of Free Games won (8, 15, or 20) | When the game returns back to the base game screen after this feature is played the banner will no longer be there |
| 2 | You've Won X Super Free Games! | When a game with Buffalo triggers the Super Free Games | X is the number of Super Free Games won (8, 15, or 20) | When the game returns back to the base game screen after this feature is played the banner will no longer be there |
| 3 | You've Won X Extreme Free Games! | When a game with Buffalo triggers the Extreme Free Games | X is the number of Extreme Free Games won (8, 15, or 20) | When the game returns back to the base game screen after this feature is played the banner will no longer be there |
| 4 | You've Won X Free Games! | When a game with Whales of Cash triggers the Free Games | X is the number of Free Games won (10, 15, or 25) | When the game returns back to the base game screen after this feature is played the banner will no longer be there |
| 5 | You've Won X Super Free Games! | When a game with Whales of Cash triggers the Super Free Games | X is the number of Super Free Games won (10, 15 or 25) | When the game returns back to the base game screen after this feature is played the banner will no longer be there |
| 6 | You've Won X Extreme Free Games! | When a game with Whales of Cash triggers the Extreme Free Games | X is the number of Extreme Free Games won (10, 15 or 25) | When the game returns back to the base game screen after this feature is played the banner will no longer be there |
| 7 | You've Won X Free Games! | When a game with Rhino Charge triggers the Free Games | X is the number of free games won | When the game returns back to the base game screen after this feature is played the banner will no longer be there |
| 8 | You've Won X Super Free Games! | When a game with Rhino Charge triggers the Super Free Games | X is the number of Super Free Games won | When the game returns back to the base game screen after this feature is played the banner will no longer be there |

TABLE 1-continued

| # | Message | When is it displayed? | What are the parameters/variables? | When is it removed? |
|---|---|---|---|---|
| 9 | You've Won X Extreme Free Games! | When a game with Rhino Charge triggers the Extreme Free Games | X is the number of Extreme Free Games won | When the game returns back to the base game screen after this feature is played the banner will no longer be there |
| 10 | Congratulations! You've Won X Free Games! | When a game with Wild Amer' coins triggers the Free Games | X is the number of Free Games won (max X value is 100) | When the game returns back to the base game screen after this feature is played the banner will no longer be there |
| 11 | Congratulations! You've Won X Super Free Games! | When a game with Wild Ameri' coins triggers the Super Free Games | X is the number of Super Free Games won (max X value is 100) | When the game returns back to the base game screen after this feature is played the banner will no longer be there |
| 12 | Congratulations! You've Won X Extreme Free Games! | When a game with Wild Ameri' coins triggers the Extreme Free Games | X is the number of Super Free Games won (max X value is 100) | When the game returns back to the base game screen after this feature is played the banner will no longer be there |
| | Congratulations! Your win so far XXXX Credits | After Free Games/ Super Free Games/ Extreme Free Games if these conditions are true: If it was not the last feature to be played If the win from the feature is >=12× the bet for that game OR a banner has been shown on a previous feature. | XXXX is the total win of the entire game round so far including trigger wins. This should be the same amount as the total amount displayed on the win meter | The banner should be displayed for 5 seconds. |
| | Congratulations! You have won XXXX Credits | After Free Games/ Super Free Games/ Extreme Free Games if these conditions are true: If it was the last feature to be played. If the win from the feature is >=12× the bet for that game OR a banner has been shown on a previous feature. | XXXX is the total win of the entire game round including trigger wins. This should be the same amount as the total amount displayed on the win meter | The banner should be displayed for 5 seconds. |

Figure 7:
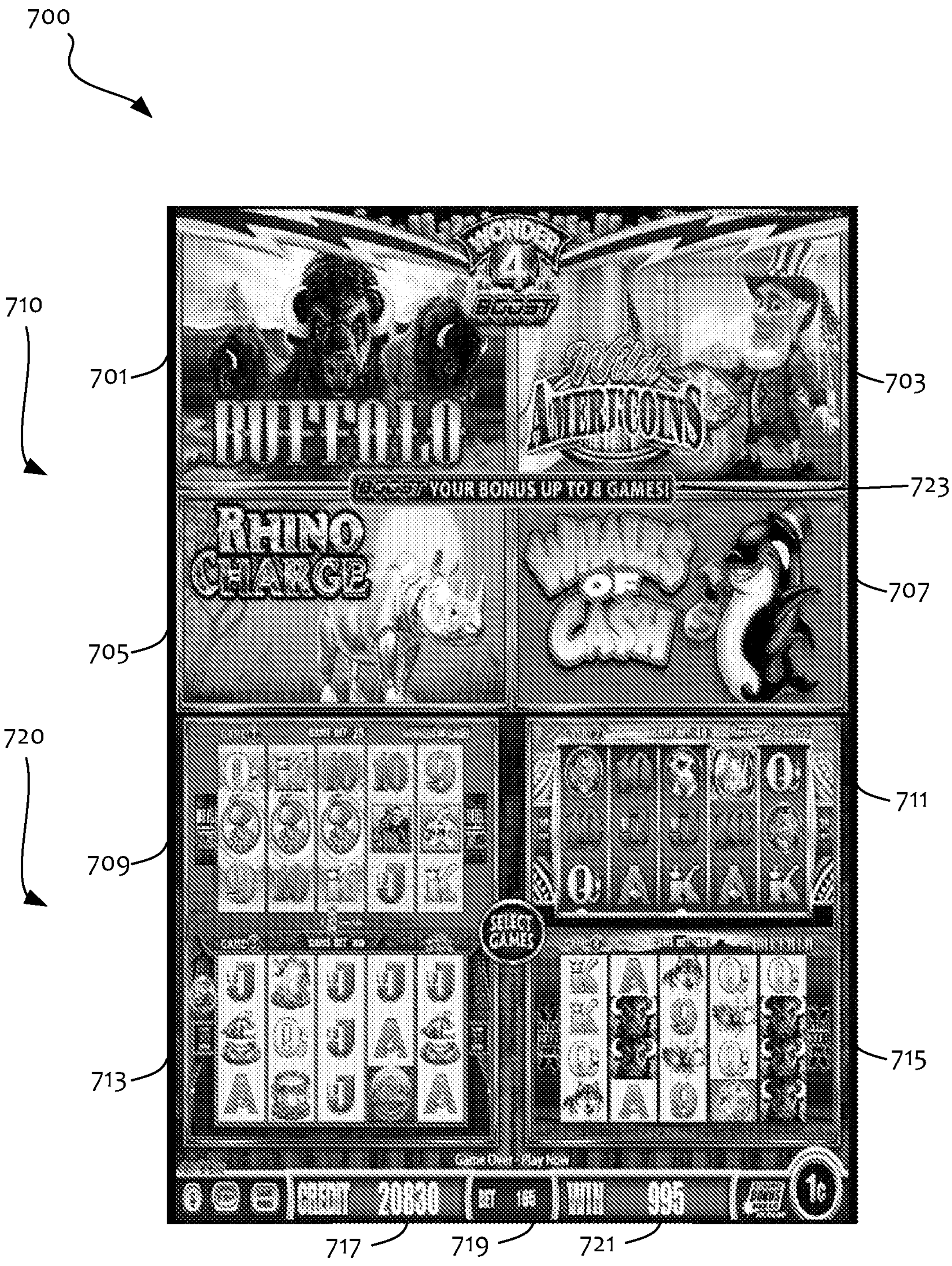
FIG. 7 shows a first display of a base game.

FIGS. 7-21 depict exemplary embodiments of screenshots from the display 54 in various stages of exemplary processes for a game outcome via the spinning reel game in accordance with various aspects of the present disclosure. The exemplary embodiment of FIG. 7 illustrates four games: Buffalo 701, Wild Ameri'coins 703, Rhino Charge 705, and Whales of Cash 707 in the banner portion 710 of the screen 700, and the associated games 709, 711, 713, and 715 in the spinning reel portion 720 of the screen 700.

Referring to FIG. 7, the display 700 may be presented, for example, at a main display 16 of the gaming device 10. The display 700 may include a credit meter 717 showing the amount of credits held by a player of the gaming device 10, a wager, or bet, display 719, and a winnings display 721.

FIG. 7 shows a base game of four games with a "Boost Your Bonus up to 8 Games" message in message display 723. The main game cycles through three massages; 'Boost Your Bonus Up To 8 Games', "((symbol)) Triggers Super Free Games", ((symbol)) Triggers Extreme Free Games" where ((symbol)) refers to the symbols such as <rhino>, <super rhino>, <blue dollar sign>, <extreme dollar sign>, <extreme blue dollar sign>, etc. described above. Since there four games being played in the example of FIG. 7, the triggers may also be for super and extreme free games.

Figure 8:
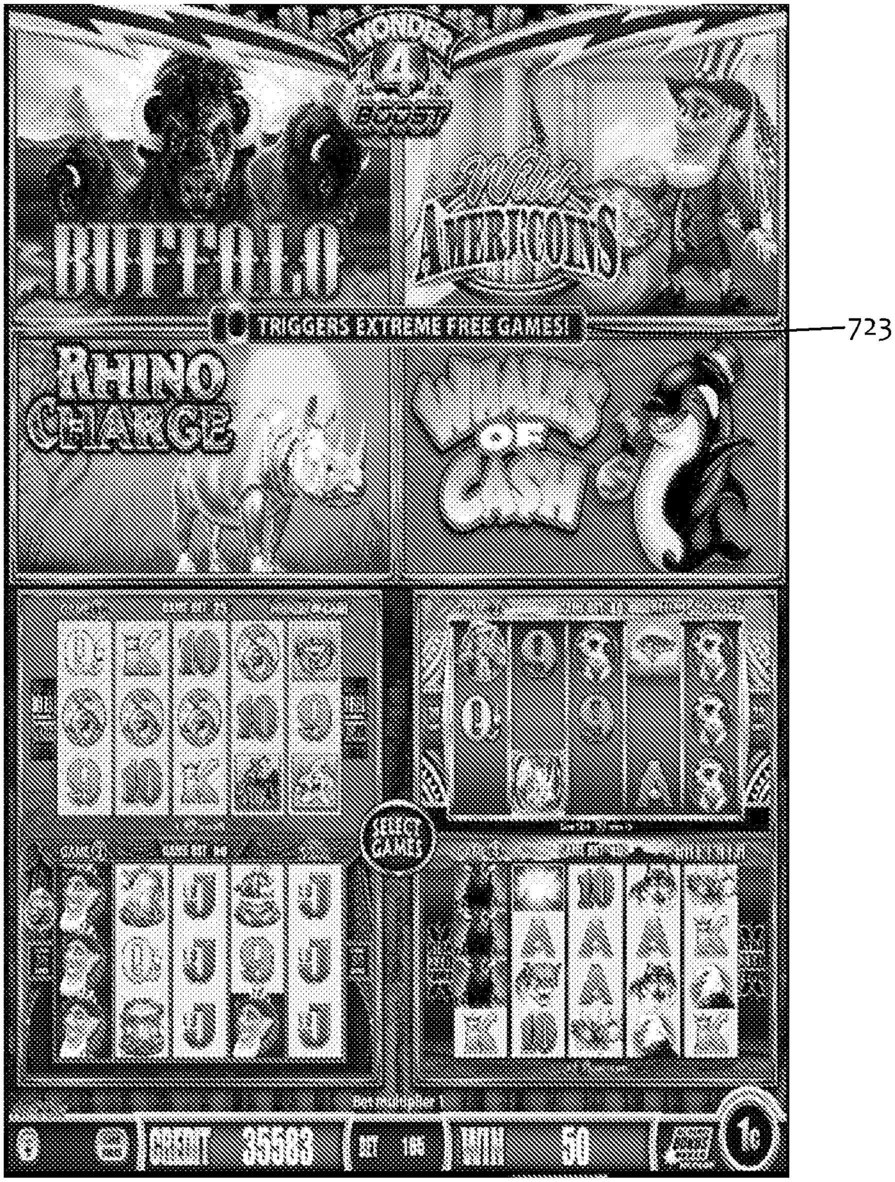
FIG. 8 shows a second display of a base game.

FIG. 8 shows a base game with a "((symbol)) Triggers Extreme Free Games" message in the message display 723, where ((symbol)) refers to the symbols such as <rhino>, <super rhino>, <blue dollar sign>, <extreme dollar sign>, <extreme blue dollar sign>, etc. described above.

Figure 9:
FIG. 9 shows a third display of a base game.

FIG. 9 shows a base game with a "((symbol)) Triggers Super Free Games" message in the message display 723, where ((symbol)) refers to the symbols such as <rhino>, <super rhino>, <blue dollar sign>, <extreme dollar sign>, <extreme blue dollar sign>, etc. described above. In addition, FIG. 9 shows a base game showing message 901 superimposed over game 709 stating "You've Won 15 Free Games" and "Press Start Feature." In this case, the free games may be started by selecting Start Feature, either on a touchscreen or physical button on the gaming device 10.

Figure 10:
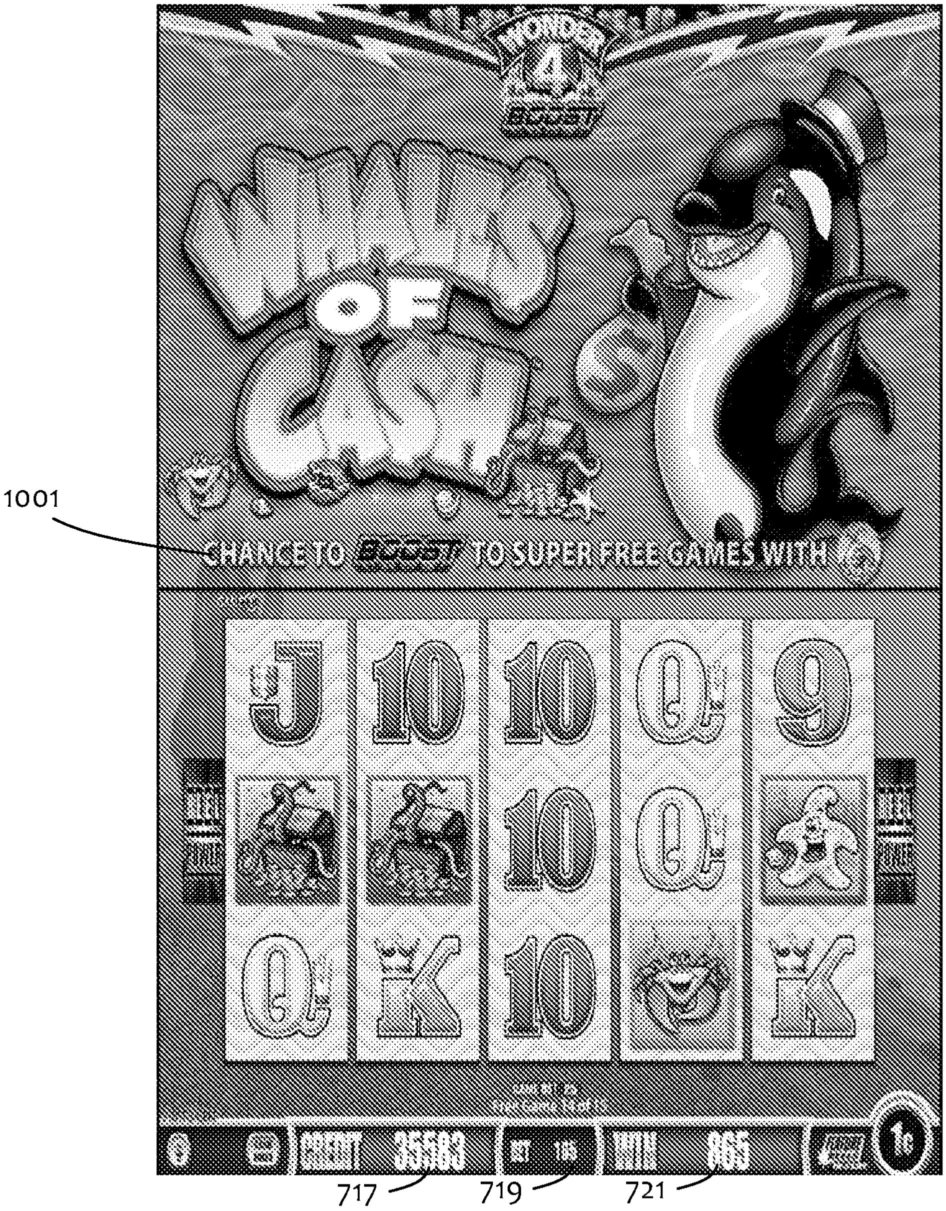
FIG. 10 shows a first display of a free spin games feature.

FIG. 10 shows a free spin games feature, with "Chance to Boost to Super Free Games With (symbol)" message 1001. In the example shown in FIG. 10, the (symbol) comprises a bag of coins with a "$" symbol. At the bottom of the display is shown the current number of credits in the credit display 717, the current bet in the bet display 719, and number of wins in the wins display 721.

Figure 11:
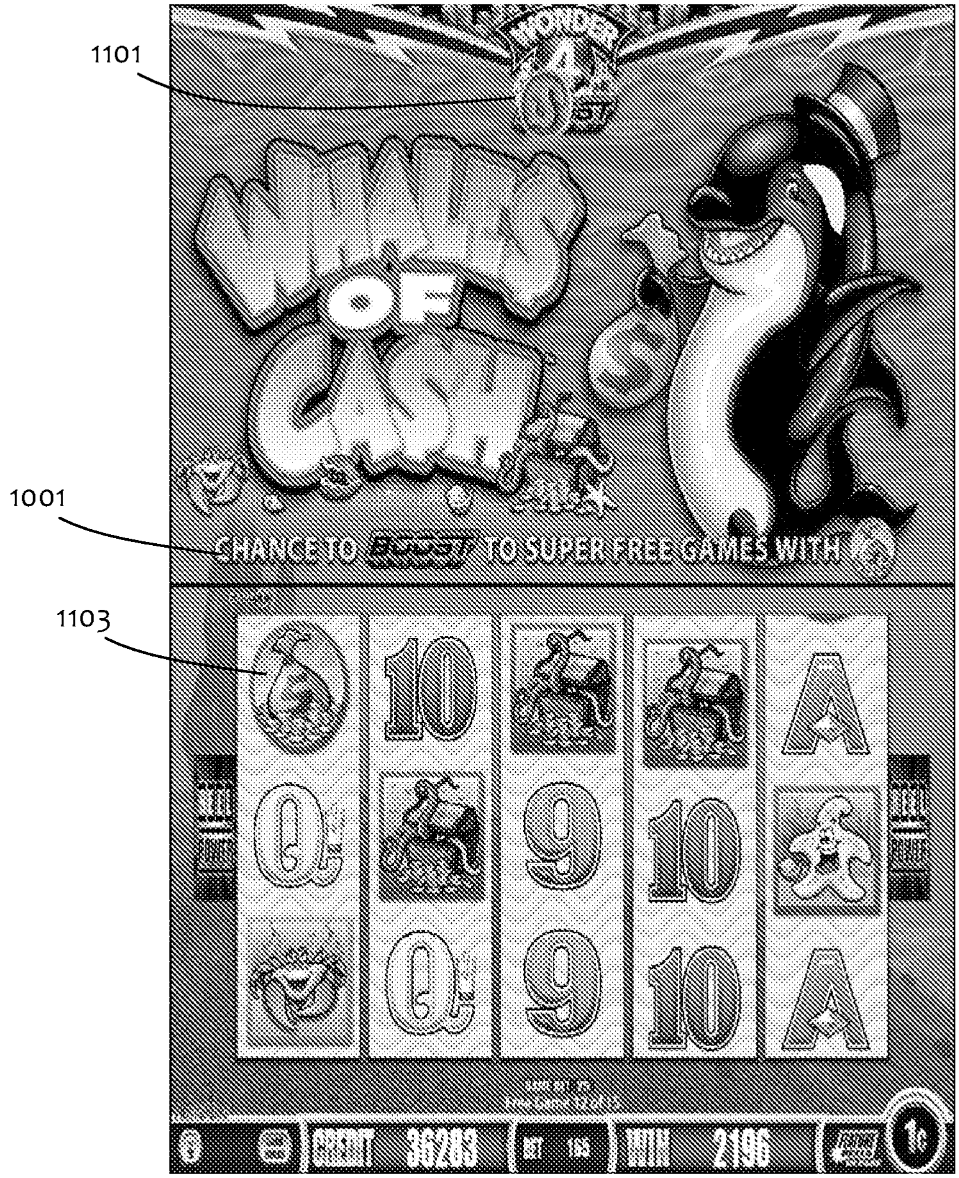
FIG. 11 shows a second display of a free spin games feature.

FIG. 11 shows a free spin games feature with triggered 'Boost' coin 1101, approaching the '4' at the top of the screen. The coin 1101 was triggered by symbol 1103, as indicated by the message 1001 "Chance to Boost to Super Free Games With (symbol)" message where the (symbol) is the symbol 1103. The coin disappears shortly following this view.

Figure 12:
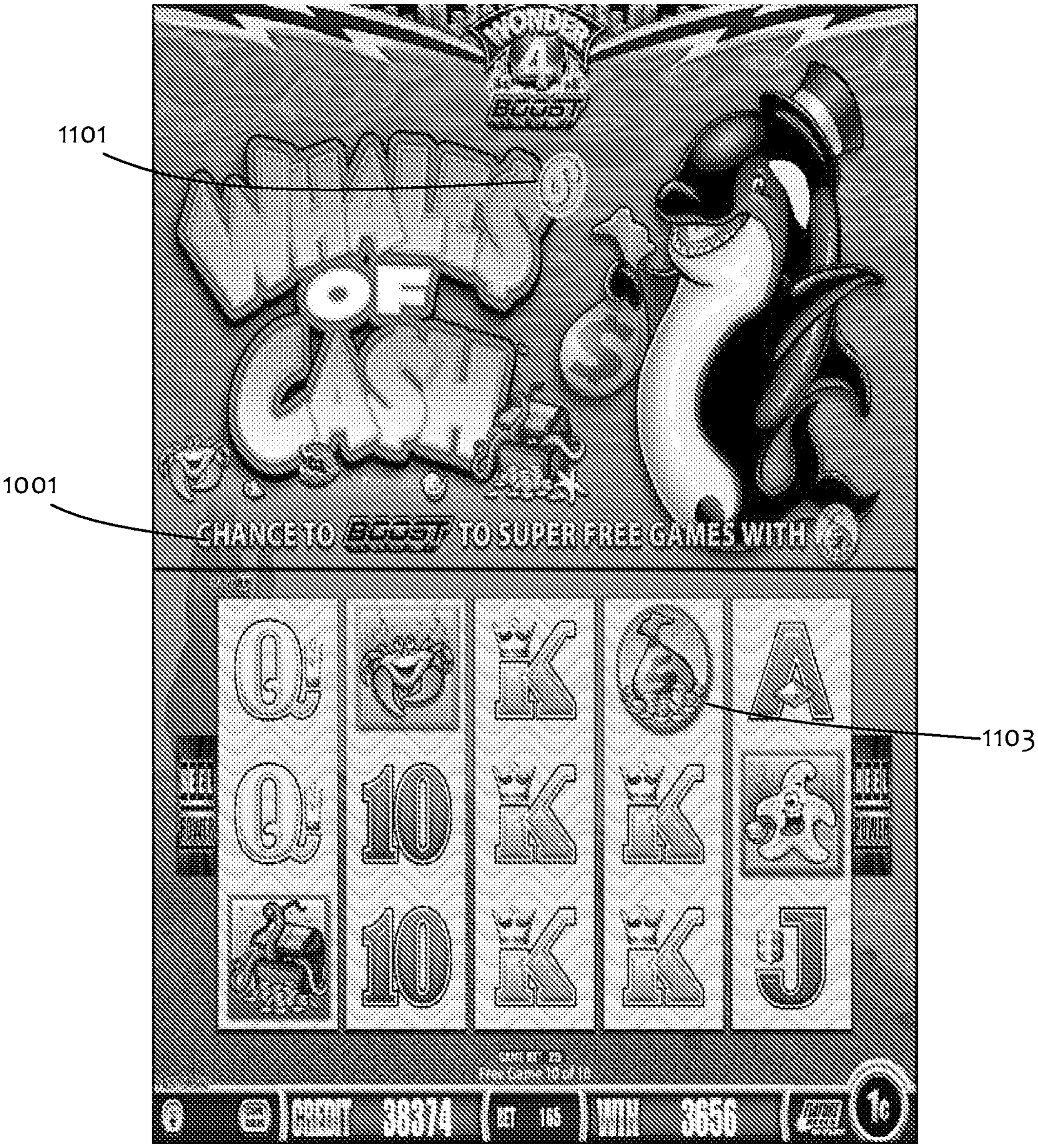
FIG. 12 shows a third display of a free spin games feature.

FIG. 12 shows another triggered 'Boost' coin 1101 on the way to the Wonder 4 Boost. The coin 1101 was triggered by symbol 1103, as indicated by the message 1001 "Chance to Boost to Super Free Games With (symbol)" message where the (symbol) is the symbol 1103. The coin disappears shortly following this view.

Figure 13:
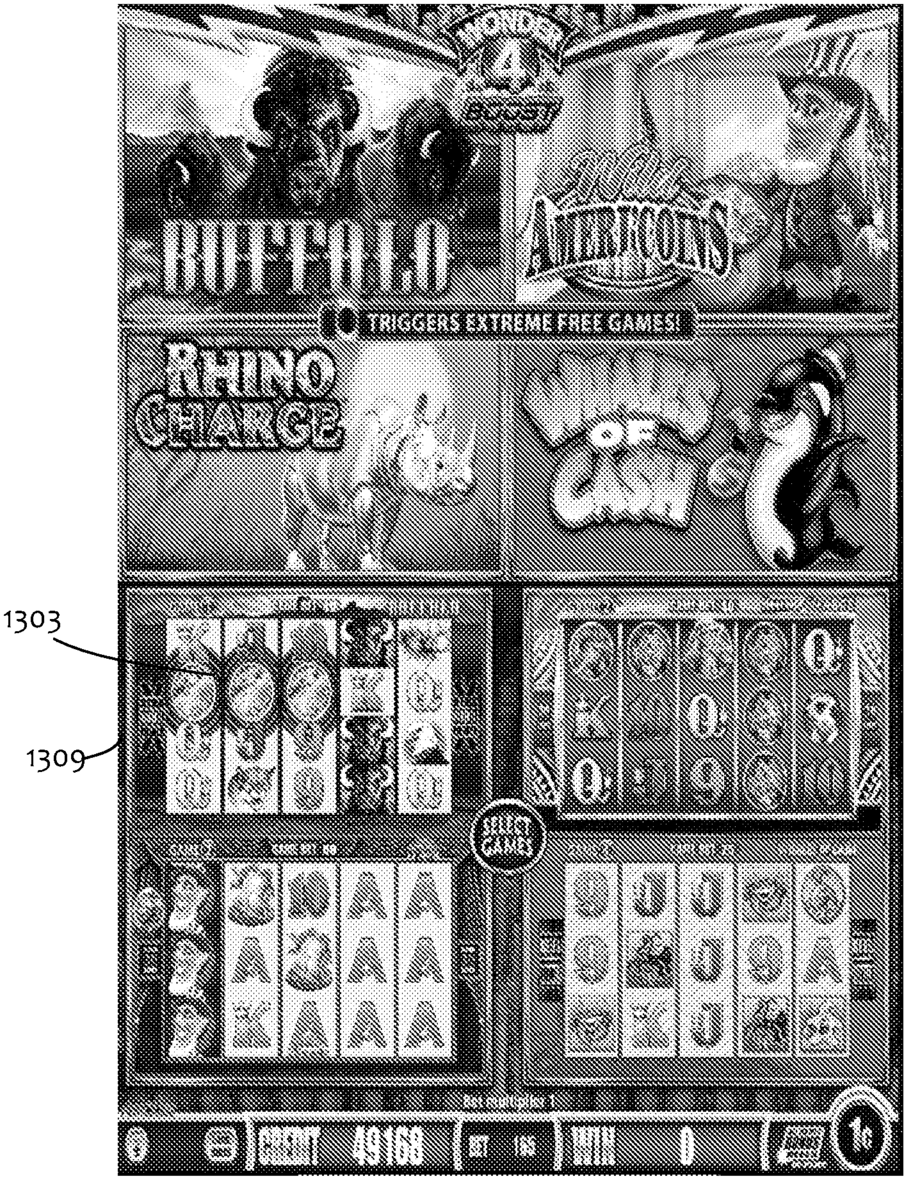
FIG. 13 shows a first display of a super free games feature.
Figure 14:
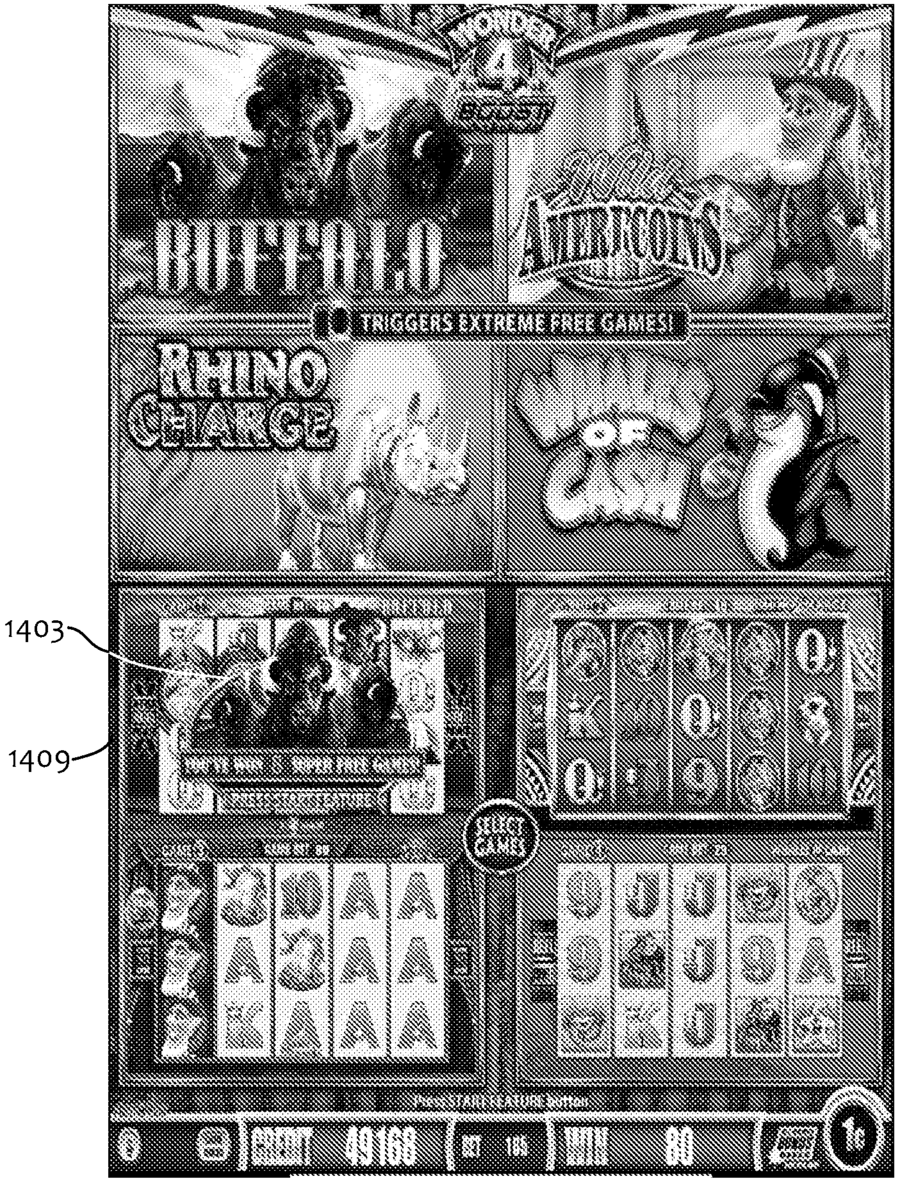
FIG. 14 shows a second display of a super free games feature.

FIG. 13 shows a super free games feature triggered on Buffalo game 1309, as indicated by the three coins 1303. FIG. 14 shows a super free games feature triggered on Buffalo base game 1409 with "You've Won 8 Super Free Games" and "Press Start Feature," message 1403 superimposed over Buffalo base game 1409. The Super Free games may be started by selecting Start Feature, either on a touchscreen or physical button on the gaming device 10.

Figure 15:
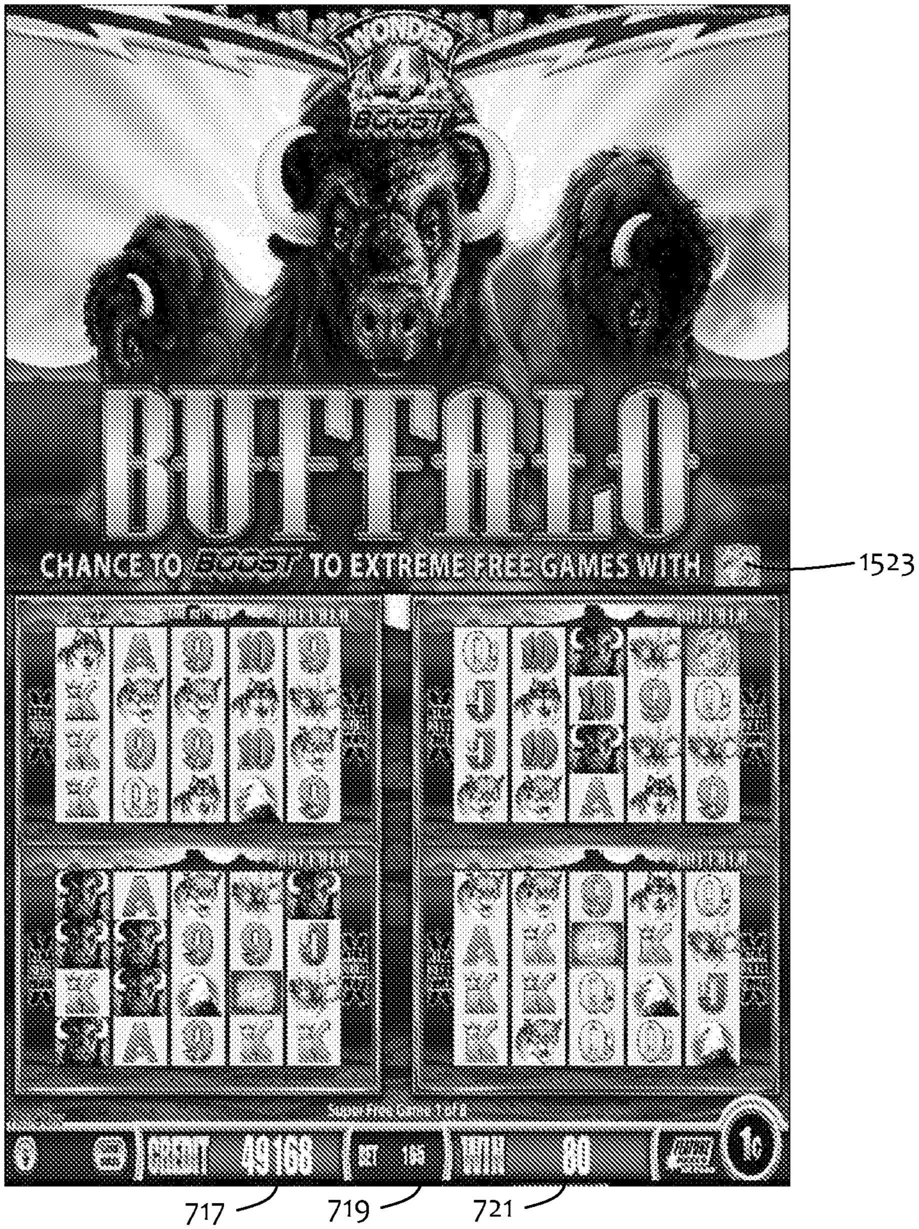
FIG. 15 shows a third display of a super free games feature.

FIG. 15 shows a super free games feature (Buffalo), with a "Chance to Boost to Extreme Free Games with a <<coin> symbol>" message in the message display 1523. At the bottom of the display is shown the current number of credits in the credit display 717, the current bet in the bet display 719, and number of wins in the wins display 721.

Figure 16:
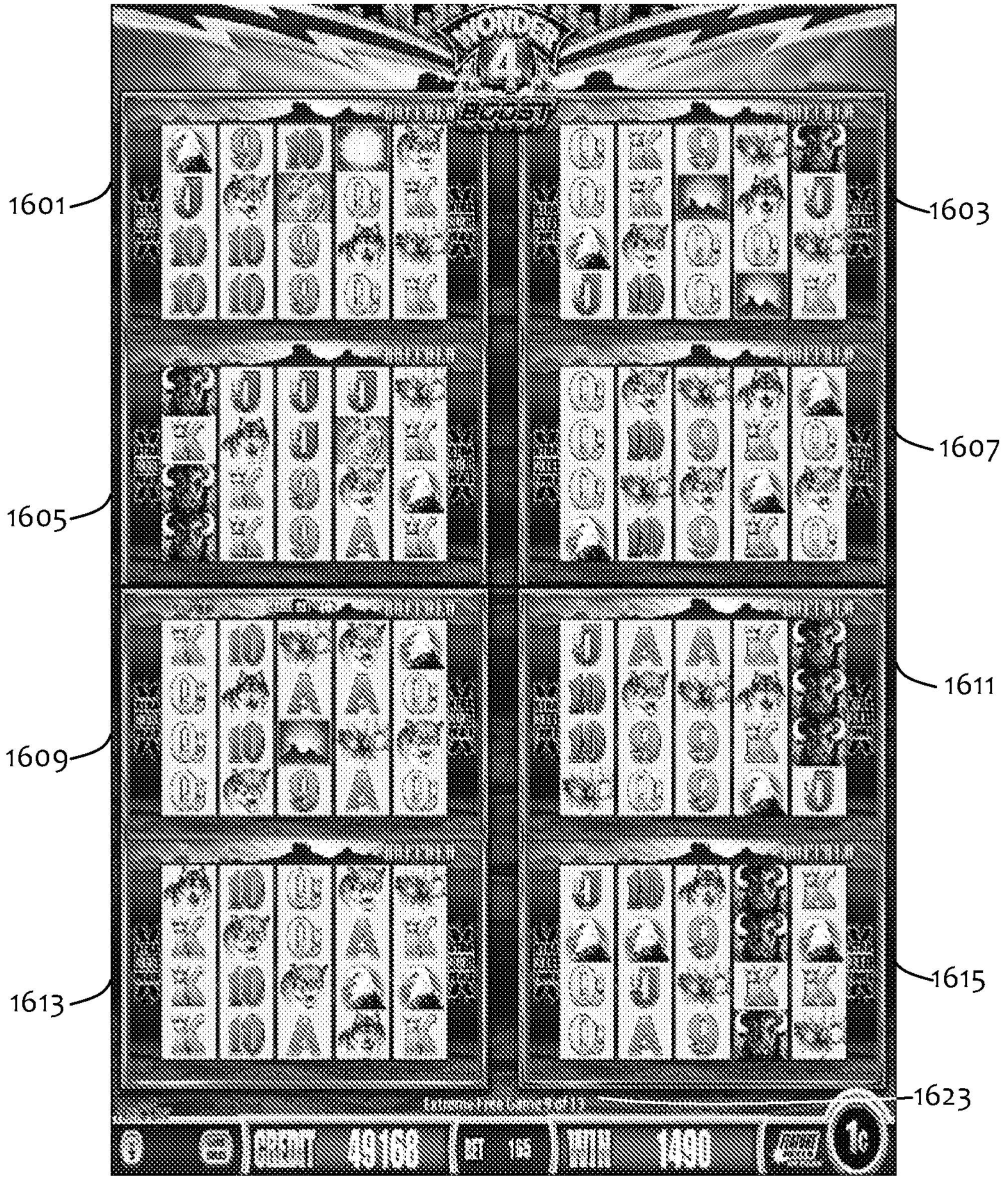
FIG. 16 shows a first display of an extreme free games feature.

FIG. 16 shows super free games boosted to Extreme Free Games, without further boost options, since it is in Extreme Free Games, the highest level. In this example, there are eight super free games 1601, 1603, 1605, 1607, 1609, 1611, 1613, and 1615. In addition, the message display 1623 near the bottom of the display indicates that this is Extreme Game 9 of 13.

Figure 17:
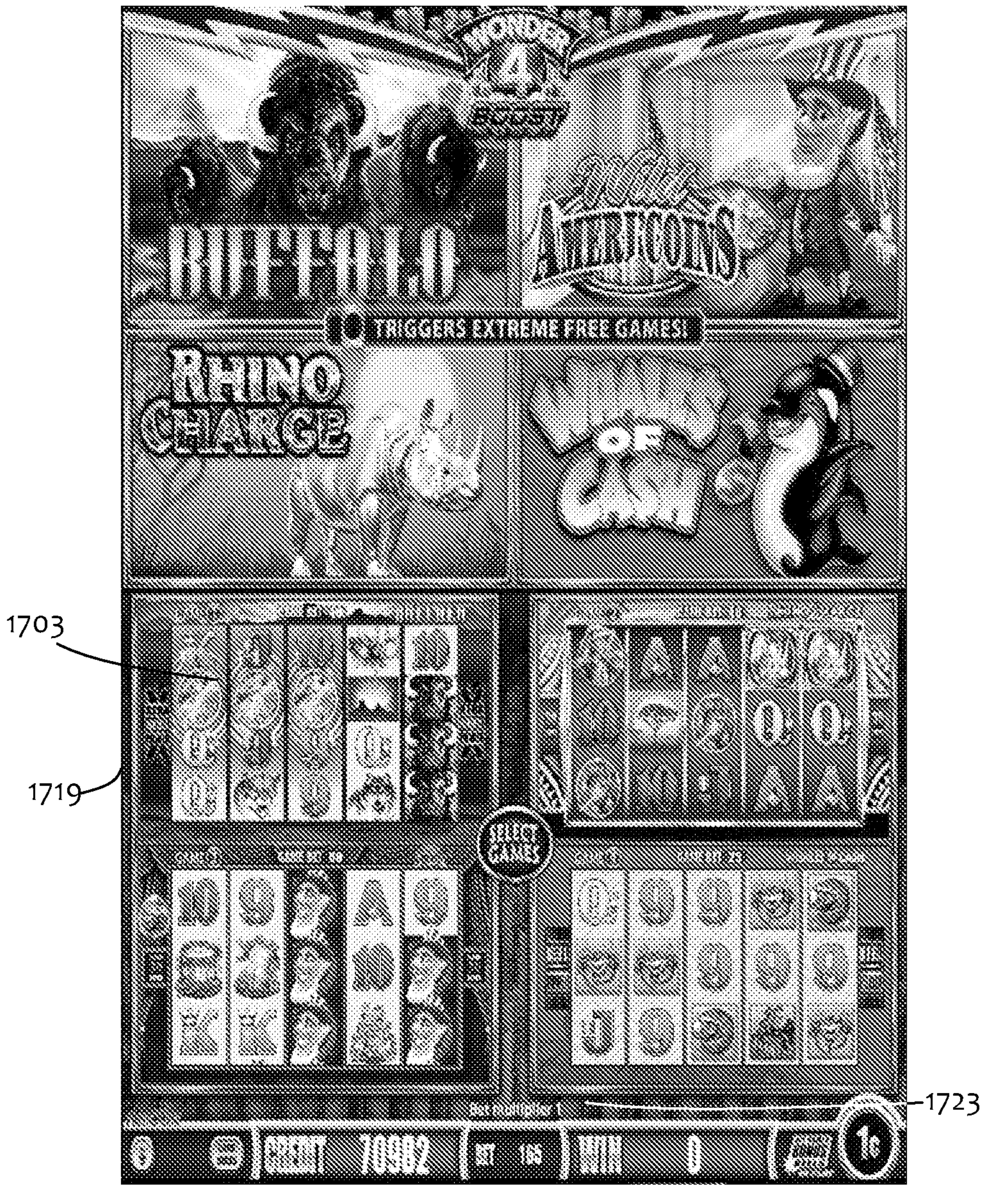
FIG. 17 shows a second display of an extreme free games feature.

FIG. 17 shows an extreme free games feature triggered on Buffalo main game 1719, with the extreme free games won indicated by the three coins 1703 in the Buffalo game 1719. In addition, the message display 1723 near the bottom of the display indicates that the bet multiplier is 1.

Figure 18:
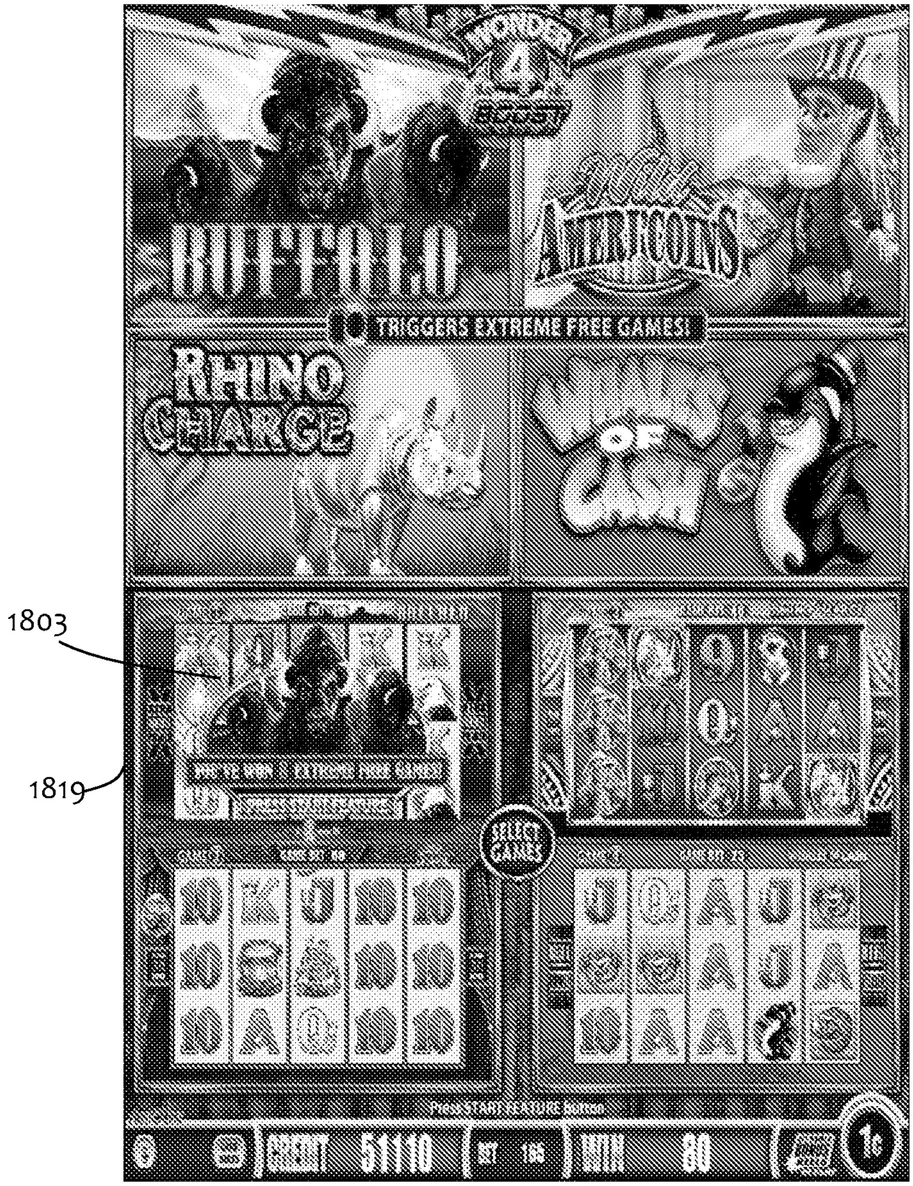
FIG. 18 shows a third display of an extreme free games feature.

FIG. 18 shows an extreme free games feature triggered on Buffalo base game 1819 with "You've Won 8 Extreme Free Games" and "Press Start Feature" message 1803 and an image of a buffalo superimposed over Buffalo base game 1819.

Figure 19:
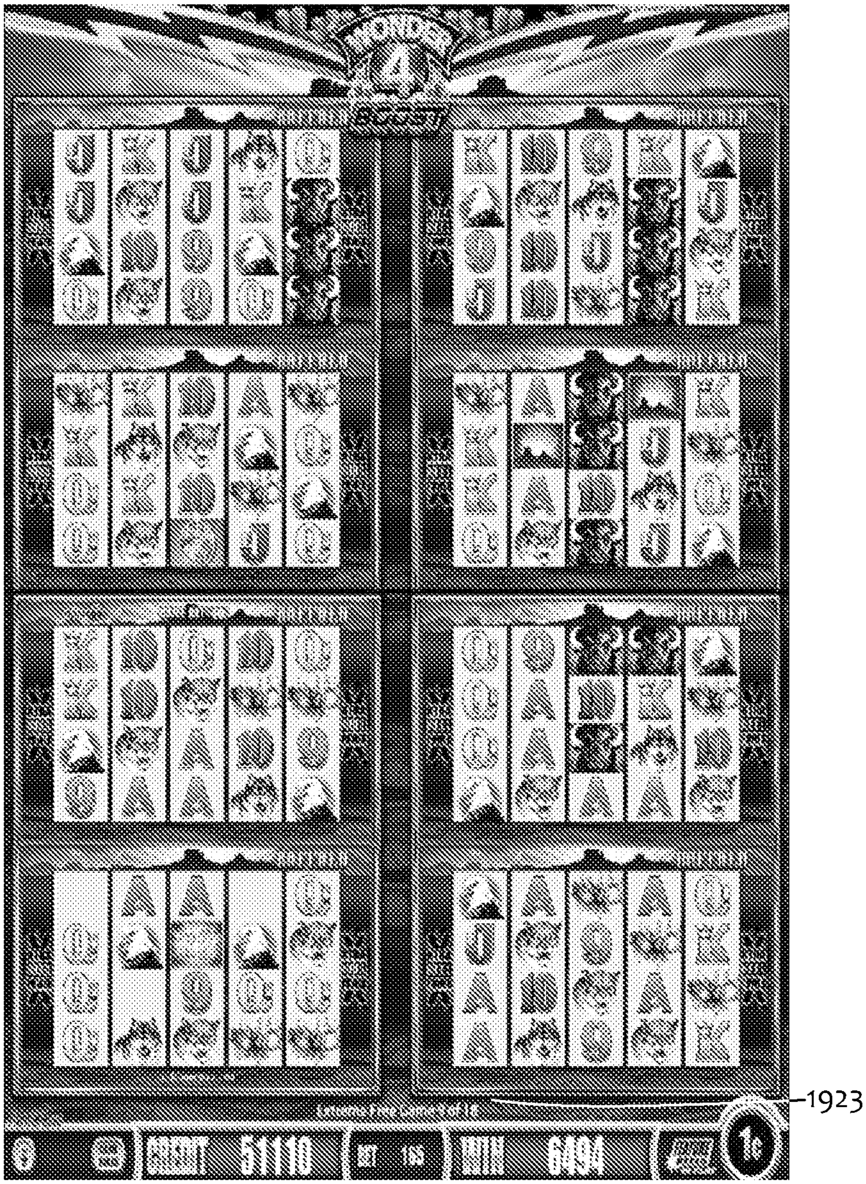
FIG. 19 shows a fourth display of an extreme free games feature.

FIG. 19 shows an extreme free games feature with free games increased from 8 to 18 from within the feature, as indicated by "Extreme Free Game 9 of 18" message 1923 at the bottom of the screen.

Figure 20:
FIG. 20 shows a fifth display of an extreme free games feature.

FIG. 20 shows an extreme free games feature with free games increased from 18 to 23 from within the feature, as indicated by "Extreme Free Game 17 of 23" message 2023 at the bottom of the screen. Also, at the bottom of the display is shown the current number of credits in the credit display 717, the current bet in the bet display 719, and number of wins in the wins display 721.

Figure 21:
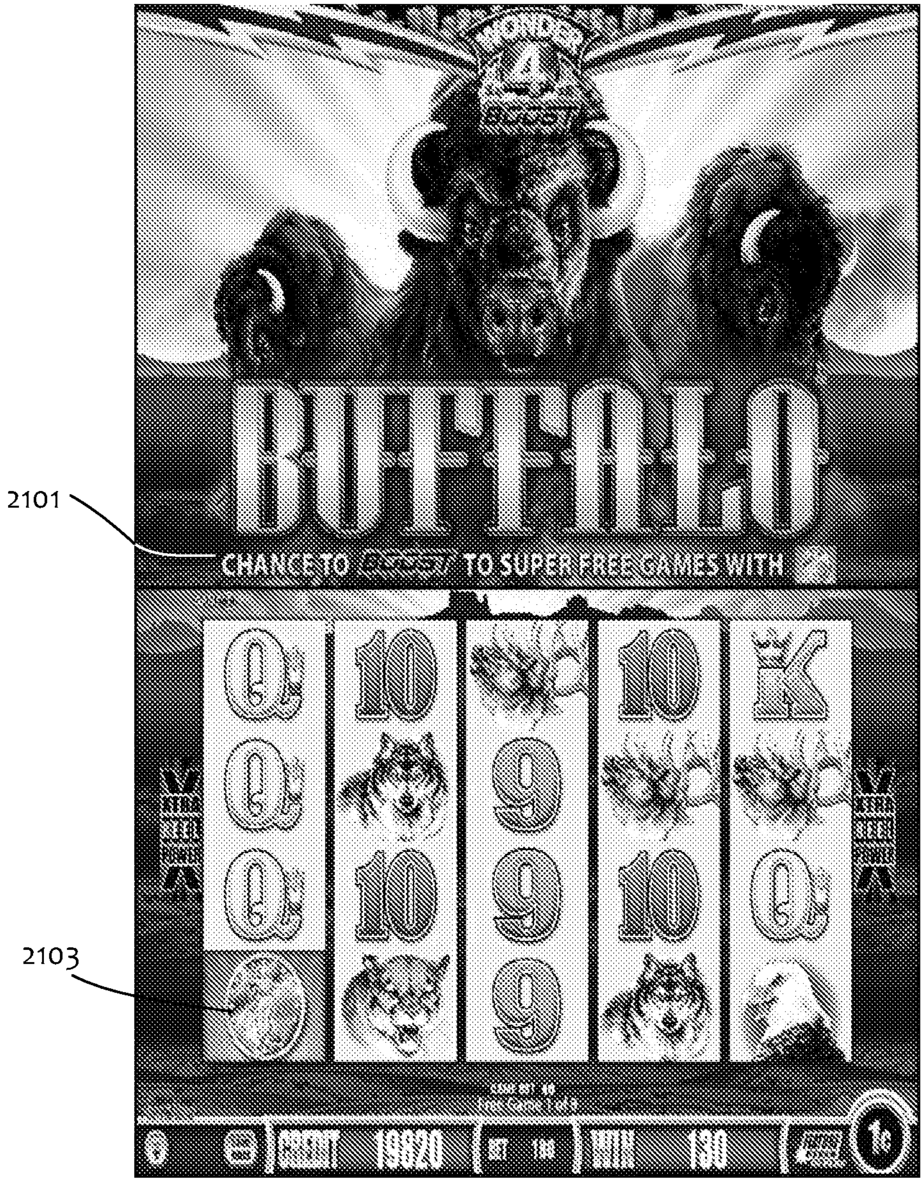
FIG. 21 shows another free spins feature.

FIG. 21 shows a buffalo free spins feature with a chance to boost to super free games with a <coin> symbol message 2101. A boost symbol 2103 is shown in the selected spinning reel symbols, which results in a boost to an advanced level, or super free game.

In summary, in the base game, four games of different types are played at once. Any of the four can trigger a secondary game, a free game, when three scatter trigger symbols appear. The trigger symbols come in 3 variations. A normal trigger symbol triggers normal free games, in which the machine displays a single game and plays through the free games, as shown in FIG. 10. The trigger symbol may also appear as a super free games trigger symbol, as shown by 1303 in FIG. 13, or as an extreme free games trigger symbol, as shown by 1703 in FIG. 17, which may comprise the standard trigger symbol with added border and coloration to indicate either super or extreme. In super free games, the machine displays four games and play all 4 four for each free game, as shown in FIG. 15. In extreme free games, the machine displays eight games and plays all eight for each free game, as shown in FIG. 16. In addition, during normal free games, there is a chance to boost (or upgrade) to super free games when special symbols appear. Likewise, during super free games there is a chance to boost to extreme free games when special symbols appear.

Figure 22:
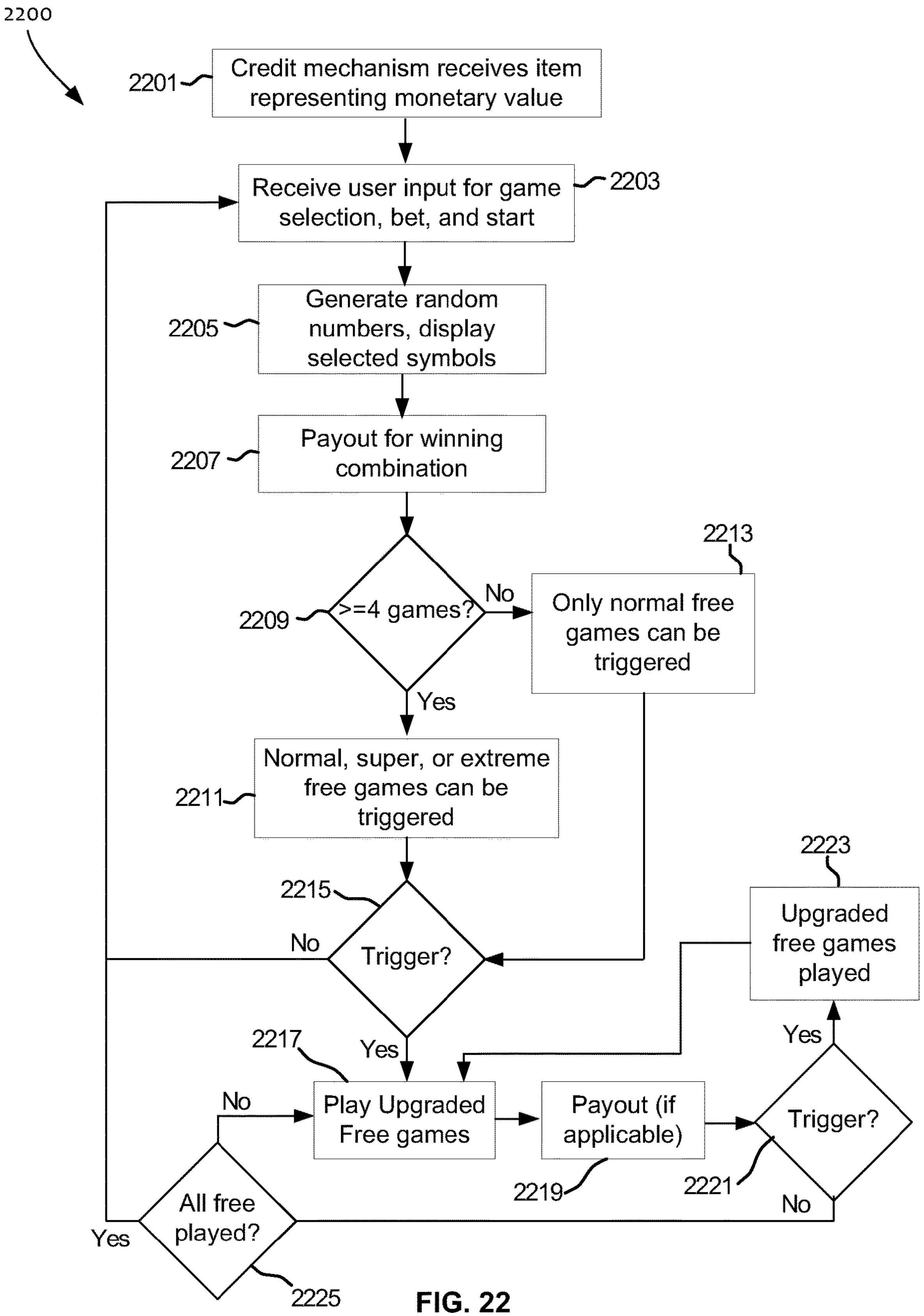
FIG. 22 illustrates a flow chart of a base, free, and upgraded free game process.

FIG. 22 illustrates a flow chart of base, free, and upgraded free game process 2200. At block 2201, the credit mechanism 52 receives a physical item that represents a monetary value that may be used to purchase and make wagers in games. At block 2203, the game controller 60 may receive input from the user such as a wager and selection of games. In addition, once games, and number of games, have been selected, the user may indicate the desire to start the games. The user may select and start games using a touchscreen in the display 54 or using buttons on the gaming device.

At block 2205, the symbol select controller **625*a* (of FIG. 6) selects a plurality of symbols from the symbol data memory module 64.1 (of FIG. 6) and the display controller 621 causes the display 54 (of FIG. 6**) to display the selected symbols.

At block 2207, the award controller **625*d* causes the payout mechanism 52.2 (of FIG. 6) to determine an award to be paid based on data in the pay table memory module 64.5, for example, via the payout mechanism 52.2. If, in block 2209, four or more games are being played concurrently, the process may step to block 2211 where trigger controller 625*e* is set to allow triggering to normal, super, or extreme free games, indicating different levels of free games attainable. In step 2211 due to four or more games being played if a trigger symbol is selected in one of the games played (as tested in step 2215**), upgraded free games may be selected.

If, however, in step 2209 less than 4 games are being played, the process steps to block 2213, where the trigger controller **625*e*** is set to allow only normal free games when triggered, i.e., not triggered to upper level games, such as super or extreme free games.

In block 2215, the trigger controller **625*e* may determine if a condition is met based on, for example, symbols displayed on the display 54 that free games are triggered, and in this case, may trigger either normal, super, or extreme free games, or just normal free games to be played in block 2217 depending on which block, 2211 or 2213, the process stepped through. To trigger a feature game, the trigger controller 625***e* determines if there is a trigger symbol in one or more of the display positions. In other embodiments, the trigger controller 625*e* also determines if there is a trigger symbol in one or more of the display positions, and causes the display controller 625 to display a flying coin on the display 54. The RNG 622 then generates a number. The trigger controller 625*e* then determines whether the feature is upgraded based on the generated random number. In still other embodiments, the trigger controller 625*e* causes the display controller 625 to display a flying coin on the display 54, and determines whether the feature is upgraded based on a random number. If no trigger is detected, the process may step to block 2203 for further game selection and start by the user.

In step 2217, the triggered free games are played a predetermined number of times, as monitored by the timer/counter 623, and an award payout corresponding to the winning combination based on the pay tables may be made by the award controller 625*d* if a winning combination is selected.

In addition, the free games played may also include a trigger, determined in block 2221, for upgraded free games, such as extreme free games from super free games, for example, with the upgraded games played in block 2223. If no trigger is present in the free games, the process steps to block 2225, where the timer/counter 623 may determine if all the free games have been played. If all the free games have not been played, the process returns to block 2217 to continue the free games, but if all the free games have been played, the process steps back to step 2203 for input from the user regarding game selection, bet, and starting of new games.

Figure 23:
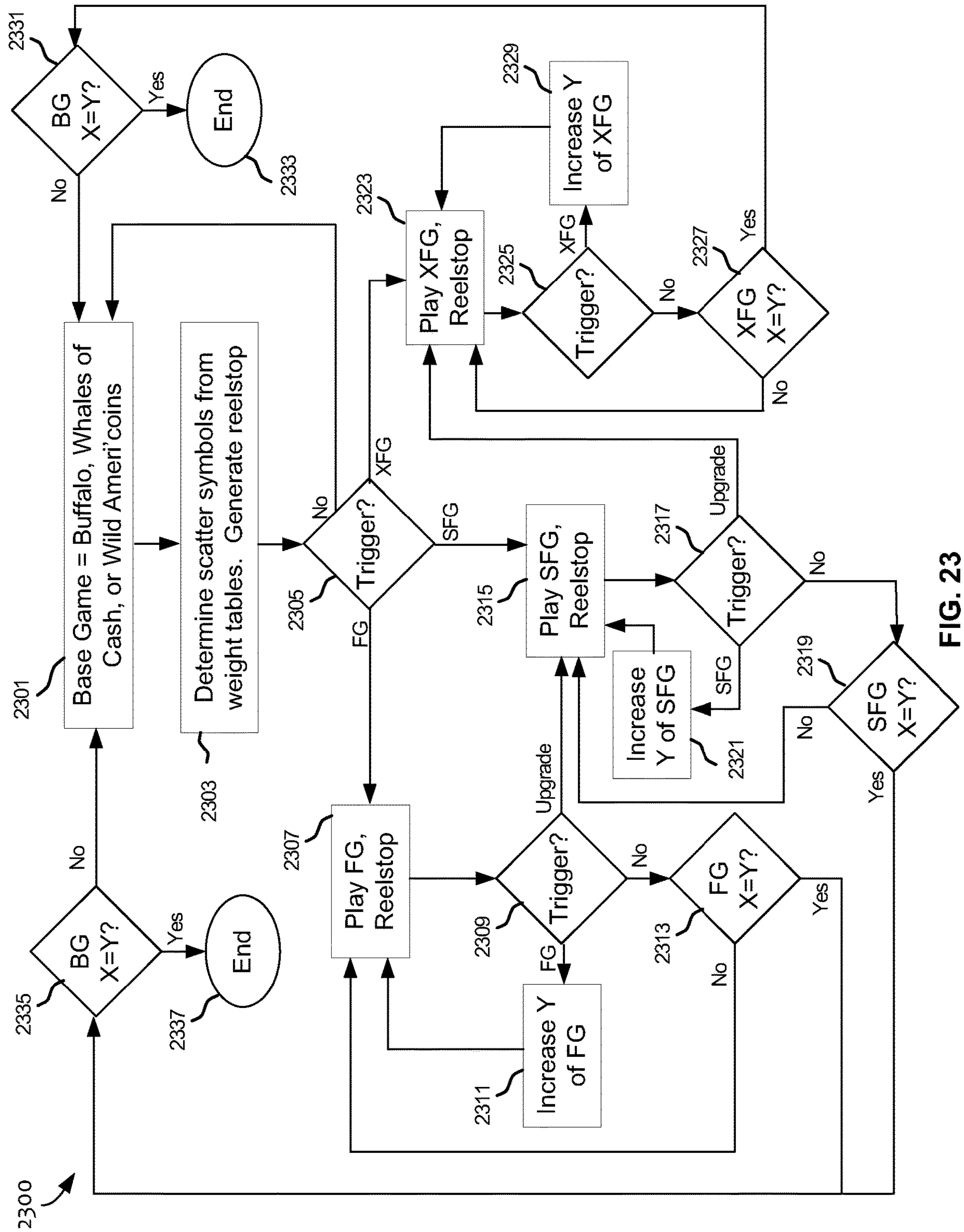
FIG. 23 illustrates a flow chart of the progression from Buffalo, Whales of Cash, or Wild Ameri'coins base games to free and upgraded free games, in accordance with an example embodiment of the disclosure.

FIG. 23 illustrates a flow chart of the progression from Buffalo, Whales of Cash, or Wild Ameri'coins base games to free and upgraded free games, in accordance with an example embodiment of the disclosure. Referring to FIG. 23, there is shown process 2300 starting at step 2301 in Buffalo, Whales of Cash, or Wild Ameri'coins base games and proceeding to step 2303 where it may be determined if the scatter symbols are for free games, super free games, or extreme free games based on weight tables. In addition, a reelstop may be generated before proceeding to step 2305, where it is determined whether one of the scatter symbols have resulted. If, in step 2305, no trigger symbols are displayed, the process steps back to step 2301 where base games are played.

If, in step 2305, a free game trigger is displayed, the process may proceed to step 2307 where triggered free game X of Y may be played, where Y is the total number of free games earned. A reelstop may be generated, upon which when a scatter symbol trigger results, the process may proceed to different steps based on which symbol is shown. For example, if a free games trigger symbol results, the process may proceed to step 2311, where the number of free games Y is increased, before proceeding back to step 2307 where free games are played.

If, however, in step 2309, an upgrade trigger symbol results, the process may proceed to step 2315, where super free games are played. Finally, if no trigger symbols result in step 2309, the process may proceed to step 2313 where it is determined whether all free games have been played, meaning X=Y in the display of Game X of Y being played. If yes, the process may proceed to step 2335, where it may be determined if all base games have been played, If not all base games have been played, the process proceeds back to step 2301 where the base games are played, and if all base games have been played, proceeds to end step 2337.

If, in step 2305, a super free game trigger is displayed, the process may proceed to step 2315, where super free game X of Y is played, where Y is the total number of super free games earned. A reelstop may be generated, upon which when a scatter symbol results, the process may proceed to different steps based on which symbol is shown. For example, if another super free games trigger symbol results, the process may proceed to step 2321, where the number of super free games Y is increased, before proceeding back to step 2315 where super free games are played.

If, however, in step 2317, an upgrade trigger symbol results, the process may proceed to step 2323, where extreme free games are played. Finally, if no trigger symbols result in step 2317, the process may proceed to step 2319 where it is determined whether all super free games have been played, meaning X=Y in the display of Game X of Y being played. If no, the process may proceed to step 2315 where the super free games are played, and if yes, the process may proceed to step 2335, where it may be determined if all base games have been played, If not all base games have been played, the process proceeds back to step 2301 where the base games are played, and if all base games have been played, proceeds to end step 2337.

If, in step 2305, an extreme free games trigger is displayed, the process may proceed to step 2323, where extreme free game X of Y is played, where Y is the total number of super free games earned. A reelstop may be generated, upon which when a scatter symbol results, the process may proceed to different steps based on which symbol is shown. For example, if another extreme free games trigger symbol results, the process may proceed to step 2329, where the number of extreme free games Y is increased, before proceeding back to step 2323 where super free games are played.

If no trigger symbols result in step 2325, the process may proceed to step 2327 where it is determined whether all extreme free games have been played, meaning X=Y in the display of Game X of Y being played. If no, the process may proceed to step 2323 where remaining extreme free games are played, and if yes, the process may proceed to step 2331, where it may be determined if all base games have been played, If not all base games have been played, the process proceeds back to step 2301 where the base games are played, and if all base games have been played, proceeds to end step 2333.

Figure 24:
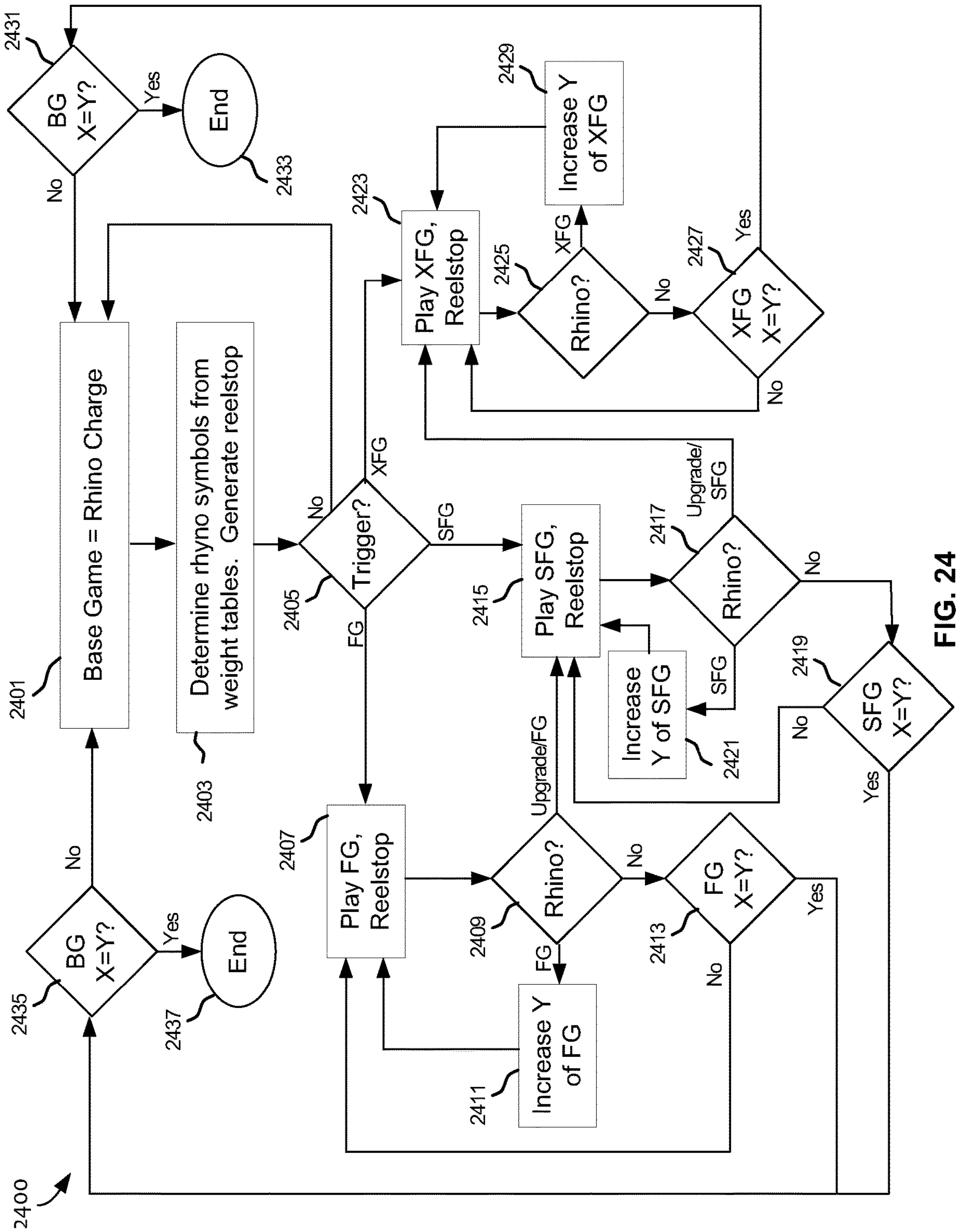
FIG. 24 illustrates a flow chart of the progression from Rhino Charge base game to free and upgraded free games, in accordance with an example embodiment of the disclosure.

FIG. 24 illustrates a flow chart of the progression from Rhino Charge base game to free and upgraded free games, in accordance with an example embodiment of the disclosure. Referring to FIG. 24, there is shown process 2400 starting at step 2401 in a Rhino Charge base game and proceeding to step 2403 where it may be determined if the rhino symbols are for free games, super free games, or extreme free games based on weight tables. In addition, a reelstop may be generated before proceeding to step 2405, where it is determined whether one of the rhino symbols have resulted. If, in step 2405, no rhino symbols are displayed, the process steps back to step 2401 where base games are played.

If, in step 2405, a free game rhino symbol is displayed, the process may proceed to step 2407 where triggered free game X of Y may be played, where Y is the total number of free games earned. A reelstop may be generated, upon which when a rhino symbol trigger results, the process may proceed to different steps based on which rhino symbol is shown. For example, if a free games rhino trigger symbol results, the process may proceed to step 2411, where the number of free games Y is increased, before proceeding back to step 2407 where free games are played.

If, however, in step 2409, an upgrade rhino trigger symbol results, the process may proceed to step 2415, where super free games are played. In addition, more free games may also be earned as well as the upgraded super free games, resulting in an increase in the total number Y of free games earned. Finally, if no rhino trigger symbols result in step 2409, the process may proceed to step 2413 where it is determined whether all free games have been played, meaning X=Y in the display of Game X of Y being played. If yes, the process may proceed to step 2435, where it may be determined if all base games have been played, If not all base games have been played, the process proceeds back to step 2401 where the base games are played, and if all base games have been played, proceeds to end step 2437.

If, in step 2405, a super free game rhino trigger is displayed, the process may proceed to step 2415, where super free game X of Y is played, where Y is the total number of super free games earned. A reelstop may be generated, upon which when a rhino symbol results, the process may proceed to different steps based on which rhino symbol is shown. For example, if another super free games rhino trigger symbol results, the process may proceed to step 2421, where the number of super free games Y is increased, before proceeding back to step 2415 where super free games are played.

If, however, in step 2417, an upgrade trigger symbol results, the process may proceed to step 2423, where extreme free games are played. In addition, more super free games may also be earned as well as the upgraded extreme free games, resulting in an increase in the total number Y of super free games earned. Finally, if no rhino trigger symbols result in step 2417, the process may proceed to step 2419 where it is determined whether all super free games have been played, meaning X=Y in the display of Game X of Y being played. If no, the process may proceed to step 2415 where the super free games are played, and if yes, the process may proceed to step 2435, where it may be determined if all base games have been played, If not all base games have been played, the process proceeds back to step 2401 where the base game is played, and if all base games have been played, proceeds to end step 2437.

If, in step 2405, an extreme free games rhino trigger is displayed, the process may proceed to step 2423, where extreme free game X of Y is played, where Y is the total number of super free games earned. A reelstop may be generated, upon which when a rhino symbol results, the process may proceed to different steps based on which symbol is shown. For example, if another extreme free games rhino trigger symbol results, the process may proceed to step 2429, where the number of extreme free games Y is increased, before proceeding back to step 2423 where super free games are played.

If no rhino trigger symbols result in step 2425, the process may proceed to step 2427 where it is determined whether all extreme free games have been played, meaning X=Y in the display of Game X of Y being played. If not, the process may proceed to step 2423 where remaining extreme free games are played, and if yes, the process may proceed to step 2431, where it may be determined if all base games have been played, If not all base games have been played, the process proceeds back to step 2401 where the base games are played, and if all base games have been played, proceeds to end step 2433.

In a gaming machine for playing a base game having a feature game with a plurality of levels: receiving a wager from a player for playing four instances of the base game, where the wager is deducted from a credit balance established by the player. A plurality of symbols for each of the four instances of the base game may be selected and displayed, where each instance displays the selected plurality of symbols in a matrix of display positions. The feature game may be initiated when the selected plurality of symbols includes a feature game trigger, where the feature game comprises a plurality of free plays of a number of instances of the base game. the number of instances is based on a level of the feature game as determined by the feature game trigger, and the number of instances is one if the level is normal, four if the level is super, and eight if the level is extreme.

The feature game may be played and outcomes determined for each of the number of instances for the plurality of free plays. The player may be awarded based on the determined outcomes by increasing the credit balance. The level of the feature game may be upgraded from normal to super, super to extreme, or normal to extreme based on a second feature game trigger occurring during the feature game. The gaming machine may receive selections from the player of the base game to be played for each of the four instances from a plurality of different games. The feature game trigger may occur when the plurality of symbols displayed in one instance includes three special scatter symbols.

The level of the feature game may be super when the special scatter symbols have a first border and extreme when the special scatter symbols have a second border. Each of the four instances of base games comprise a different game or each of the four instances of base games comprise a same game. The electronic gaming machine comprises a game controller processor with an upgrade controller that upgrades the level of the feature game to the super or extreme levels. The game controller processor comprises an evaluation controller that evaluates the symbols selected for display to determine if the selected symbols form a winning outcome. The game controller processor comprises a trigger controller that determines when the upgrade of the level of the feature game is available.

In example embodiments a gaming system may comprise a credit input mechanism configured to receive a physical item to establish a credit balance, the credit balance being increasable and decreasable based at least on wagering activity; a display having a plurality of display positions; a payout mechanism and a game controller. The game controller may be configured to select a plurality of symbols for one or more instances of base games; cause the display to display the selected symbols at the display positions; and determine whether to provide one or more instances of free feature games based on whether the selected plurality of symbols comprises a trigger symbol.

One instance of a first level free feature game may be displayed if a first level trigger symbol is displayed when less than four instances of base games are played. Four instances of an upgraded second level free feature game may be displayed if a second level trigger symbol is displayed when four instances of base games are played. Eight instances of an upgraded third level free feature game may be displayed if a third trigger symbol is displayed when four instances of base games are played. The game controller may determine if outcomes of each of the one or more instances of base games and any free feature games includes a win. The payout mechanism may be configured to cause a payout associated with any wins, the payout being applied toward the credit balance.

The instance of the first level free feature game may be upgraded to the second level free feature game if a second level upgrade trigger is displayed. The instance of the first level free feature game may be upgraded to the third level free feature game if a third level upgrade trigger is displayed. The four instances of second level free feature game may be upgraded to the third level of free feature game if the third level upgrade trigger is displayed. When four instances of base games are displayed, each may be the same or a different game.

The game controller may comprise a processor with an upgrade controller that upgrades the base game to one of the three levels of free feature games. The processor may comprise a trigger controller that determines when the upgrade of the base game is available. The processor may comprise an evaluation controller that evaluates the symbols selected for display to determine if the selected symbols form a winning outcome. The first level free feature game may comprise normal free games, the second level free feature game may comprise super free games, and the third level free feature game may comprise extreme free games.

In example embodiments, a gaming machine may include a credit input mechanism configured to receive a physical item to establish a credit balance, the credit balance being increasable and decreasable based at least on wagering activity; a credit meter configured to monitor the credit balance; a display having a plurality of display positions.

The gaming machine may also comprise a game controller configured to: select a plurality of symbols for a base game, and cause the display to display the selected symbols at the display positions; determine whether to provide one of a plurality of levels of free feature games; and determine if an outcome of the determined feature game includes a win and if upgraded, display multiple versions of the free feature game on the display. A payout mechanism may be configured to cause a payout associated with a win. The game controller may also comprises a processor with an upgrade controller that upgrades the base game to one or more of the three levels of free feature games.

The processor may comprise a trigger controller that determines when the upgrade of the base game is available. The upgrade of the base game may be available when the trigger controller determines that there is a trigger symbol in one or more of the display positions. A random number generator may provide random numbers to the processor for selecting the plurality of symbols. The random number generator may also generate a number with which the trigger controller uses to determine whether the free feature games are upgraded.

The processor may comprise an evaluation controller that evaluates the symbols selected for display to determine if the selected symbols form a winning outcome. The game controller may comprise memory that stores a plurality of game rules that specify how the base game and the free feature games are played. The game controller may comprise a counter that counts how many times the base game and/or free feature games are played. The plurality of levels of free feature games may include normal free games, super free games, and extreme free games.

In some embodiments, when more than one triggers occur in the base game, the feature games associated with the triggers may be played back to back.

In some embodiments, when more than one trigger occurs in the base game, and when one of the feature games triggers a boost or an upgrade, the one feature game is finished first. The other of the feature games then commences depending on how the other of the feature games is originally triggered. For example, when the one feature game has been boosted to a super feature game, and when the other feature game is triggered to a normal feature game, the other feature game commences with the normal feature game after the super feature game associated with the one feature game is completed.

In some embodiments, when a super free game feature commences, flying coins to upgrade the super free game feature may be awarded.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments.

It is to be understood that, if any prior art is referred to herein, such reference does not constitute an admission that the prior art forms a part of the common general knowledge in the art in any country.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. An electronic gaming system for playing a plurality of different base games and a feature game, the electronic gaming system comprising:

a server, operable to be coupled to one or more electronic gaming devices, and comprising at least one processor and a memory storing a plurality of trigger symbols including a plurality of normal triggering symbols, a plurality of super triggering symbols, and a plurality of extreme triggering symbols, and instructions, which, when executed cause the at least one processor to at least:

control a display device on a first electronic gaming device to concurrently animate a plurality of symbols being selected for each of a plurality of base games being played using at least one random number from a random number generator, responsive to one or more trigger symbols being displayed in a first base game, control the display device to animate the feature game including concurrently initiating a plurality of concurrent instances of the first base game based on the one or more trigger symbols displayed, wherein the plurality of concurrent instances of the first base game is less when the one or more trigger symbols include the normal triggering symbols than when the one or more trigger symbols include the super triggering symbols, and is less when the one or more trigger symbols include the super triggering symbols than when the one or more trigger symbols include the extreme triggering symbols, control the display device to animate a plurality of outcomes for each of the plurality of concurrent instances of the first base game, and control the display device to animate one or more awards based on the plurality of outcomes animated.

2. The electronic gaming system of claim 1, wherein the instructions, when executed, further cause the at least one processor to upgrade the feature game at the first electronic gaming device from playing the plurality of concurrent instances of the first base game to playing a second plurality of concurrent instances of the first base game, wherein the second plurality of concurrent instances of the first base game is more than the plurality of concurrent instances of the first base game.

3. The electronic gaming system of claim 1, and wherein the instructions, when executed, further cause the display device to animate a base game among the plurality of different base games being dragged from a selection menu and being dropped to a window in which the base game is played.

4. The electronic gaming system of claim 1, wherein the plurality of normal triggering symbols include a plurality of scatter symbols.

5. The electronic gaming system of claim 4, wherein the plurality of super triggering symbols include the plurality of scatter symbols with a first border and the plurality of extreme triggering symbols include the plurality of scatter symbols with a second border.

6. The electronic gaming system of claim 1, wherein the instructions, when executed, further cause the first electronic gaming device to transition to animating a different plurality of concurrent instances after completing the plurality of concurrent instances of the first base game responsive to a second trigger symbol appearing in the plurality of concurrent instances of the first base game.

7. The electronic gaming system of claim 1, wherein the instructions, when executed, further cause the first electronic gaming device to animate a different plurality of concurrent instances of a second base game after completing the plurality of concurrent instances of the first base game responsive to a second trigger symbol appearing in the second base game among the plurality of different base games.

8. A method of displaying a plurality of different base games and a feature game in an electronic gaming system having at least one electronic gaming device having a display device to display at least one of the plurality of different base games, and, a server, operable to be coupled to at least one electronic gaming device, and comprising at least one processor and a memory storing a plurality of trigger symbols including a plurality of normal triggering symbols, a plurality of super triggering symbols, and a plurality of extreme triggering symbols, and instructions, which, when executed cause the at least one processor to initiate the plurality of different base games, the method comprising:

animating a plurality of symbols being selected at the display device for each of a plurality of base games being played using at least one random number from a random number generator;

responsive to the display device displaying one or more trigger symbols in a first base game, animating at the display device the feature game including concurrently initiating a plurality of concurrent instances of the first base game based on the one or more trigger symbols displayed, wherein the plurality of concurrent instances of the first base game is less when the one or more trigger symbols include the plurality of normal triggering symbols than when the one or more trigger symbols include the plurality of super triggering symbols, and is less when the one or more trigger symbols include the plurality of super triggering symbols than when the one or more trigger symbols include the plurality of extreme triggering symbols;

animating at the display device a plurality of outcomes for each of the plurality of concurrent instances of the first base game; and animating at the display device an award based on the plurality of outcomes animated.

9. The method of claim 8, further comprising upgrading the feature game at the at least one electronic gaming device from playing the plurality of concurrent instances of the first base game to playing a second plurality of concurrent instances of the first base game, wherein the second plurality of concurrent instances of the first base game is more than the plurality of concurrent instances of the first base game.

10. The method of claim 8, further comprising the display device animating a base game among the plurality of different base games being dragged from a selection menu and being dropped to a window in which the base game is played.

11. The method of claim 8, wherein the plurality of normal triggering symbols include a plurality of scatter symbols.

12. The method of claim 11, wherein the plurality of super triggering symbols include the plurality of scatter symbols with a first border and the plurality of extreme triggering symbols include the plurality of scatter symbols with a second border.

13. The method of claim 8, further comprising transitioning to animating a different plurality of concurrent instances after completing the plurality of concurrent instances of the first base game responsive to a second trigger symbol appearing in the plurality of concurrent instances of the first base game.

14. The method of claim 8, further comprising animating a different plurality of concurrent instances of a second base game after completing the plurality of concurrent instances of the first base game responsive to a second trigger symbol appearing in the second base game among the plurality of different base games.

15. A non-transitory computer-readable medium comprising instructions, for conducting a plurality of different base games and a feature game via a server comprising at least one processor, the instructions, which, when executed, cause one or more processors to perform the steps of:

signaling a display device of a first electronic gaming device to concurrently animate a plurality of symbols being selected for each of a plurality of base games being played using at least one random number from a random number generator;

evaluating the plurality of symbols for one or more trigger symbols in a first base game;

responsive to the one or more trigger symbols appeared in the first base game, signaling the display device to concurrently animate at the display device a plurality of concurrent instances of the first base game as the feature game based on the one or more trigger symbols displayed, wherein the plurality of concurrent instances of the first base game is less when the one or more trigger symbols include normal triggering symbols than when the one or more trigger symbols include super triggering symbols, and is less when the one or more trigger symbols include super triggering symbols than when the one or more trigger symbols include extreme triggering symbols;

signaling the display device to animate a plurality of outcomes for each of the plurality of concurrent instances of the first base game; and signaling the display device to animate one or more awards based on the plurality of outcomes animated.

16. The non-transitory computer-readable medium of claim 15, wherein the instructions, when executed, further cause the at least one processor to perform the step of upgrading the feature game at the first electronic gaming device from playing the plurality of concurrent instances of the first base game to playing a second plurality of concurrent instances of the first base game, wherein the second plurality of concurrent instances of the first base game is more than the plurality of concurrent instances of the first base game.

17. The non-transitory computer-readable medium of claim 15, wherein the instructions, when executed, further cause the at least one processor to perform the step of controlling the display device to animate a base game among the plurality of different base games being dragged from a selection menu and being dropped to a window in which the base game is played.

18. The non-transitory computer-readable medium of claim 15, wherein the normal triggering symbols include a plurality of scatter symbols, the super triggering symbols include the plurality of scatter symbols with a first border, and the extreme triggering symbols include the plurality of scatter symbols with a second border.

19. The non-transitory computer-readable medium of claim 15, wherein the instructions, when executed, further cause the first electronic gaming device to perform the step of transitioning to animating a different plurality of concurrent instances after completing the plurality of concurrent instances of the first base game responsive to a second trigger symbol appearing in the plurality of concurrent instances of the first base game.

20. The non-transitory computer-readable medium of claim 15, wherein the instructions, when executed, further cause the first electronic gaming device to perform the step of animating a different plurality of concurrent instances of a second base game after completing the plurality of concurrent instances of the first base game responsive to a second trigger symbol appearing in the second base game among the plurality of different base games.

* * * * *